United States Patent
Sumi et al.

(10) Patent No.: US 9,292,760 B2
(45) Date of Patent: Mar. 22, 2016

(54) APPARATUS, METHOD, AND NON-TRANSITORY COMPUTER-READABLE MEDIUM

(71) Applicant: CANON KABUSHIKI KAISHA, Tokyo (JP)

(72) Inventors: Naoki Sumi, Kawasaki (JP); Yusuke Hashii, Tokyo (JP); Hiroyuki Sakai, Chigasaki (JP); Hiroyasu Kunieda, Yokohama (JP); Kiyoshi Umeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 39 days.

(21) Appl. No.: 13/933,425

(22) Filed: Jul. 2, 2013

(65) Prior Publication Data

US 2014/0010459 A1 Jan. 9, 2014

(30) Foreign Application Priority Data

Jul. 9, 2012 (JP) .................. 2012-154005

(51) Int. Cl.
- *G06K 9/66* (2006.01)
- *G06K 9/46* (2006.01)
- *G06K 9/00* (2006.01)
- *G06T 11/60* (2006.01)

(52) U.S. Cl.
CPC .............. *G06K 9/46* (2013.01); *G06K 9/00221* (2013.01); *G06T 11/60* (2013.01)

(58) Field of Classification Search
CPC .. G06K 9/00221; G06K 9/00228; G06K 9/46
USPC .................. 382/195, 224, 100, 190, 228, 305
See application file for complete search history.

(56) References Cited

U.S. PATENT DOCUMENTS

| | | | |
|---|---|---|---|
| 5,218,387 | A | 6/1993 | Ueno et al. |
| 5,400,200 | A | 3/1995 | Bloemendaal et al. |
| 5,905,807 | A | 5/1999 | Kado et al. |
| 6,885,760 | B2 | 4/2005 | Yamada et al. |
| 6,895,103 | B2 | 5/2005 | Chen et al. |
| 6,965,684 | B2 | 11/2005 | Chen et al. |

(Continued)

FOREIGN PATENT DOCUMENTS

| | | | |
|---|---|---|---|
| JP | 5-197793 A | 8/1993 |
| JP | 8-063597 A | 3/1996 |

(Continued)

OTHER PUBLICATIONS

U.S. Appl. No. 13/926,499, filed Jun. 25, 2013, Naoki Sumi et al.

(Continued)

*Primary Examiner* — Manuchehr Rahmjoo
(74) *Attorney, Agent, or Firm* — Fitzpatrick, Cella, Harper & Scinto

(57) ABSTRACT

An apparatus comprises a determination unit configured to determine, based on a region that satisfies a predetermined condition in an image as a candidate of an output target, whether to set the region as the output target; and a decision unit configured to, in a case where a plurality of regions that satisfy the predetermined condition exists in the image, decide a portion of the image including one or a plurality of regions determined, out of the plurality of regions, as the output target by said determination unit as a portion of the output target.

19 Claims, 27 Drawing Sheets

(56) References Cited

U.S. PATENT DOCUMENTS

| | | |
|---|---|---|
| 7,103,218 B2 | 9/2006 | Chen et al. |
| 7,379,568 B2 | 5/2008 | Movellan et al. |
| 7,586,524 B2 | 9/2009 | Tsue et al. |
| 7,924,469 B2 | 4/2011 | Ono et al. |
| 7,944,588 B2 | 5/2011 | Yamada et al. |
| 8,175,155 B2 | 5/2012 | Suwa et al. |
| 8,184,337 B2 | 5/2012 | Sakai |
| 8,237,991 B2 | 8/2012 | Ono et al. |
| 8,842,934 B2 | 9/2014 | Okuhara et al. |
| 2001/0036298 A1 | 11/2001 | Yamada et al. |
| 2002/0081032 A1 | 6/2002 | Chen et al. |
| 2003/0016846 A1 | 1/2003 | Chen et al. |
| 2006/0018517 A1 | 1/2006 | Chen et al. |
| 2008/0304718 A1 | 12/2008 | Ryuto et al. |
| 2009/0034840 A1 | 2/2009 | Umeda et al. |
| 2009/0116752 A1* | 5/2009 | Isomura et al. ............... 382/217 |
| 2010/0097642 A1 | 4/2010 | Sumi |
| 2010/0118052 A1 | 5/2010 | Tsue et al. |
| 2010/0260415 A1 | 10/2010 | Sakai et al. |
| 2010/0295998 A1 | 11/2010 | Sakai et al. |
| 2011/0109923 A1 | 5/2011 | Umeda et al. |
| 2011/0158540 A1 | 6/2011 | Suzuki et al. |
| 2011/0285871 A1 | 11/2011 | Sakai |
| 2012/0014453 A1 | 1/2012 | Kawai et al. |
| 2012/0014565 A1 | 1/2012 | Akiyama et al. |
| 2012/0268759 A1 | 10/2012 | Ono et al. |

FOREIGN PATENT DOCUMENTS

| | | |
|---|---|---|
| JP | 8-077334 A | 3/1996 |
| JP | 2541688 | 10/1996 |
| JP | 11-053525 A | 2/1999 |
| JP | 11-250267 A | 9/1999 |
| JP | 2000-105829 A | 4/2000 |
| JP | 2000-132688 A | 5/2000 |
| JP | 2000-235648 A | 8/2000 |
| JP | 2001-216515 A | 8/2001 |
| JP | 2002-183731 A | 6/2002 |
| JP | 2003-030667 A | 1/2003 |
| JP | 3469031 B | 11/2003 |
| JP | 2005-044330 A | 2/2005 |
| JP | 2007-026246 A | 2/2007 |
| JP | 2010-251999 A | 11/2010 |
| JP | 2010-273144 A | 12/2010 |

OTHER PUBLICATIONS

U.S. Appl. No. 13/933,437, filed Jul. 2, 2013, Takeru Sasaki.
U.S. Appl. No. 13/926,065, filed Jun. 26, 2013, Hiroyuki Sakai.
U.S. Appl. No. 13/922,802, filed Jun. 20, 2013, Tetsuya Suwa.
U.S. Appl. No. 13/930,324, filed Jun. 28, 2013, Yuto Kajiwara.

* cited by examiner

FIG. 10

```xml
<?xml version="1.0" encoding="utf-8" ?>
<IMAGEINFO>
        <BaseInfo>
                <ID>0x00000001</ID>
                <ImagePath>C:¥My Picture¥IMG0001.jpg</ImagePath>
                <ImageSize width=3000, height=2000 />
                <CaptureDateTime>20100101:120000<CaptureDateTime>
        </BaseInfo>
        <SensInfo>
                <AveY>122</AveY>
                <AveS>38</AveS>
                <AveH>50</AveH>
                <SceneType>Landscape</SceneType>
                <Person>
                        <ID>0</ID>
                        <Position>
                                <LeftTop x=420, y=200/>
                                <LeftBottom x=420, y=300/>
                                <RightTop x=520, y=200/>
                                <RightBottom x=520, y=300/>
                        </Position>
                        <AveY>128</AveY>
                        <AveCb>-20</AveCb>
                        <AveCr>20</AveCr>
                </Person>
                ...
                <Unnecessary>
                        <ID>1</ID>
                        <Position>
                                <LeftTop x=40, y=30/>
                                <LeftBottom x=40, y=230/>
                                <RightTop x=140, y=30/>
                                <RightBottom x=140, y=230/>
                        </Position>
                </Unnecessary>
        </SensInfo>
        <UserInfo>
                <FavoriteRate>3</FavoriteRate>
                <ViewingTimes>5</ViewingTimes>
                <PrintingTimes>3</PrintingTimes>
                <Event>Travel</Event>
        </UserInfo>
        ...
</IMAGEINFO>
```

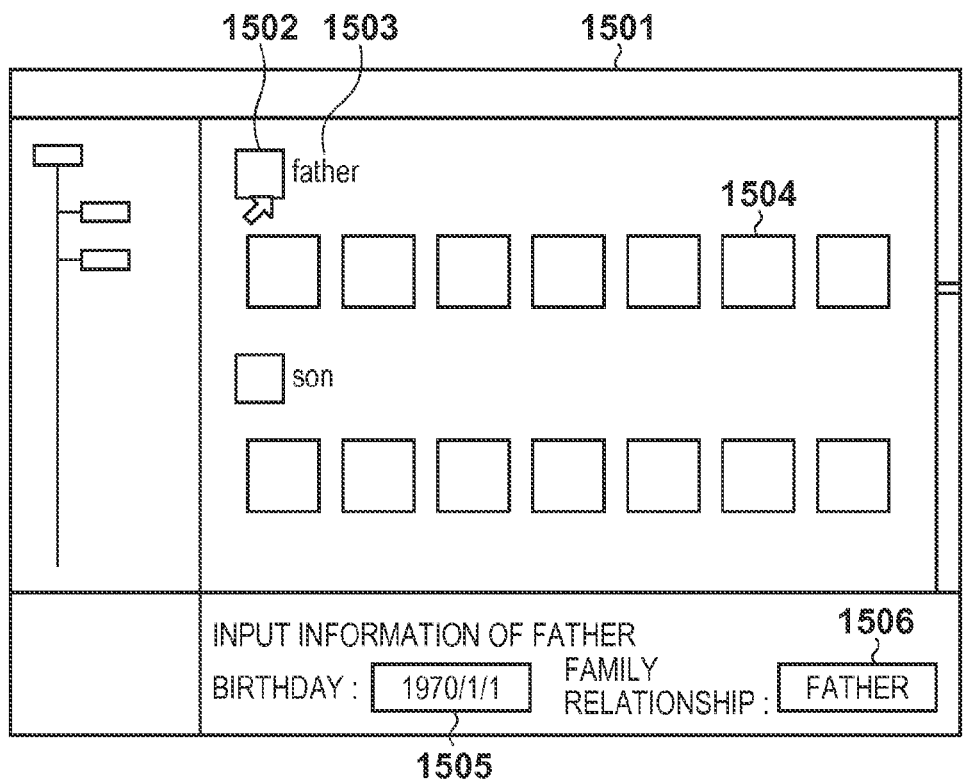

FIG. 16

```xml
<?xml version="1.0" encoding="utf-8" ?>
<LayoutInfo>
        <BASIC>
                        <Theme></Theme>
                        <PageSize>A4</PageSize>
                        <Resolution>300</Resolution>
        </BASIC>
        <ImageSlot>
                        <ID>0</ID>
                        <POSITION>
                                        <LeftTop x=100, y=200/>
                                        <LeftBottom x=100, y=800/>
                                        <RightTop x=1000, y=200/>
                                        <RightBottom x=1000, y=800/>
                        </POSITION>
                        <Shape>Rectangle</Shape>
                        <PersonGroup>MainGroup</PersonGroup>
        </ImageSlot>
        <ImageSlot>
                        <ID>1</ID>
                        <POSITION>
                                        <LeftTop x=800, y=700/>
                                        <LeftBottom x=800, y=1500/>
                                        <RightTop x=1700, y=700/>
                                        <RightBottom x=1700, y=1500/>
                        </POSITION>
                        <Shape>Rectangle</Shape>
                        <PersonGroup>MainGroup</PersonGroup>
        </ImageSlot>
        <ImageSlot>
                        <ID>2</ID>
                        <POSITION>
                                        <LeftTop x=400, y=1600/>
                                        <LeftBottom x=1000, y=2200/>
                                        <RightTop x=400, y=1600/>
                                        <RightBottom x=1000, y=2200/>
                        </POSITION>
                        <Shape>Rectangle</Shape>
                        <PersonGroup>MainGroup</PersonGroup>
        </ImageSlot>
</LayoutInfo>
```

FIG. 18

```xml
<?xml version="1.0" encoding="utf-8" ?>
<LayoutInfo>
        <BASIC>
                <Theme></Theme>
                <PageSize>A4</PageSize>
                <Resolution>300</Resolution>
        </BASIC>
        <ImageSlot>
                <ID>0</ID>
                <POSITION>
                        <LeftTop x=400, y=900/>
                        <LeftBottom x=400, y=1500/>
                        <RightTop x=1300, y=900/>
                        <RightBottom x=1300, y=1500/>
                </POSITION>
                <Shape>Rectangle</Shape>
                <PersonGroup>SubGroup</PersonGroup>
        </ImageSlot>
        <ImageSlot>
                <ID>1</ID>
                <POSITION>
                        <LeftTop x=700, y=100/>
                        <LeftBottom x=700, y=500/>
                        <RightTop x=1100, y=100/>
                        <RightBottom x=1100, y=500/>
                </POSITION>
                <Shape>ellipse</Shape>
                <PersonGroup>MainGroup</PersonGroup>
        </ImageSlot>
        <ImageSlot>
                <ID>2</ID>
                <POSITION>
                        <LeftTop x=1100, y=200/>
                        <LeftBottom x=1100, y=600/>
                        <RightTop x=1450, y=200/>
                        <RightBottom x=1450, y=600/>
                </POSITION>
                <Shape>ellipse</Shape>
                <PersonGroup>MainGroup</PersonGroup>
        </ImageSlot>

.......

</LayoutInfo>
```

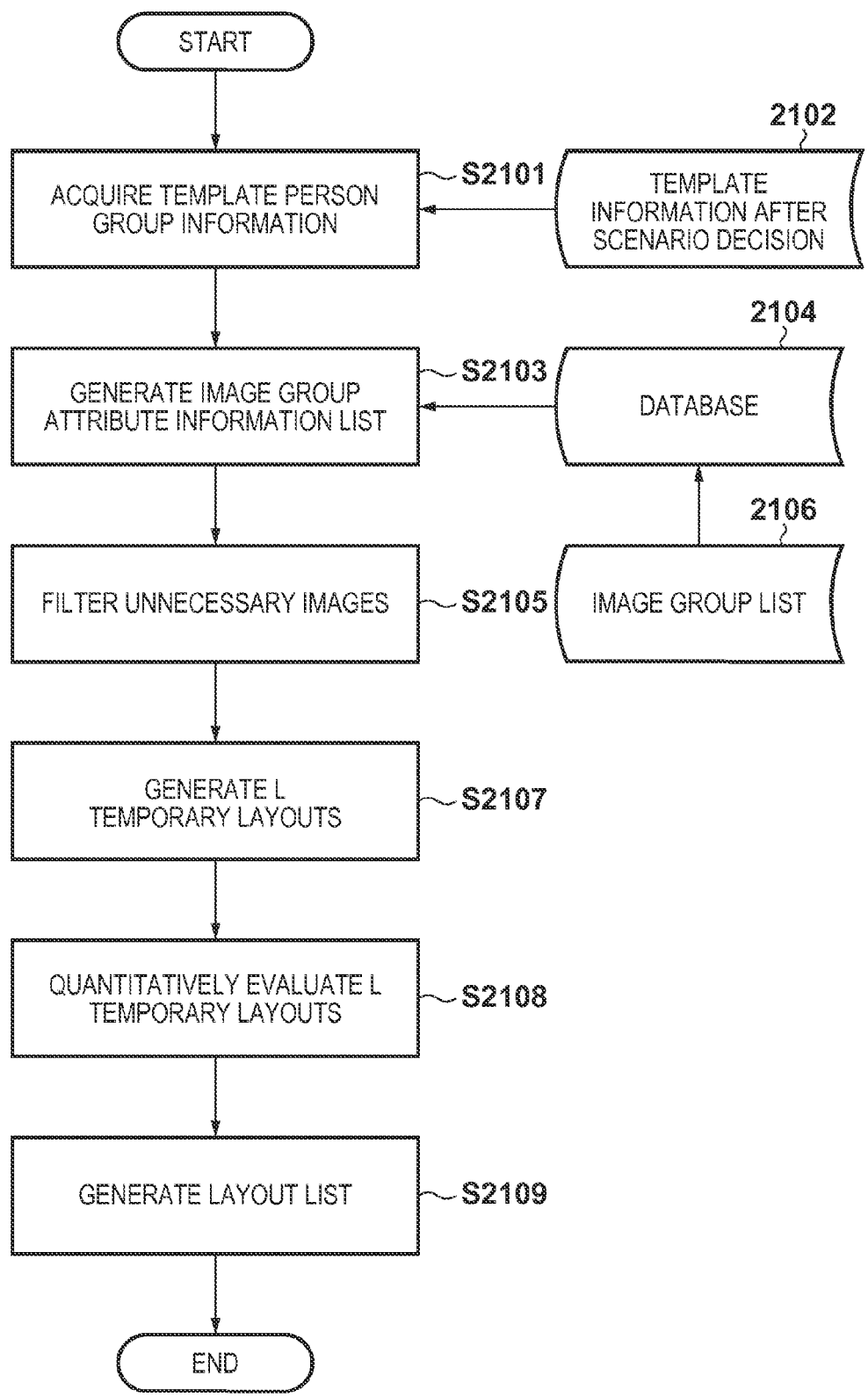

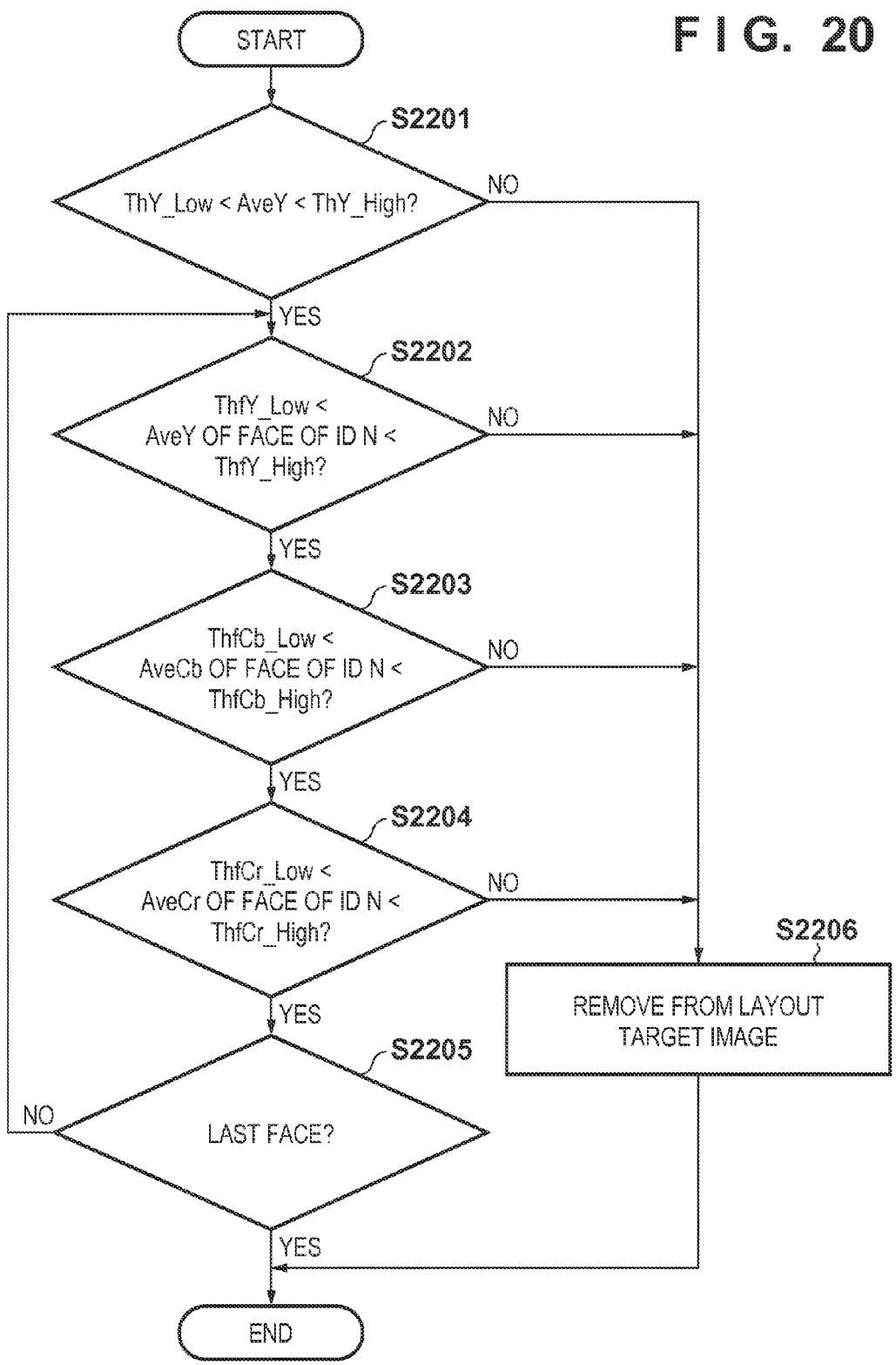

F I G. 21
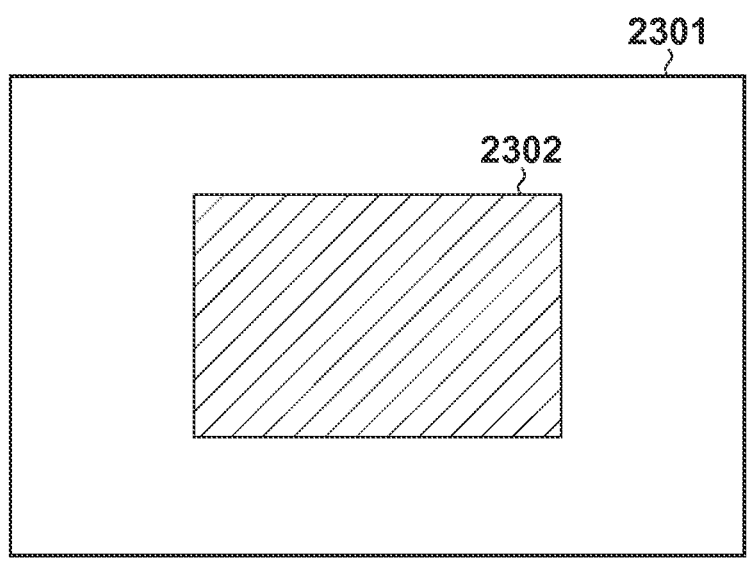

F I G. 26

```xml
<?xml version="1.0" encoding="utf-8" ?>
<LayoutInfo>
    <BASIC>
        <Theme>growth</Theme>
        <PageSize>A4</PageSize>
        <Resolution>300</Resolution>
        <MainGroup>son</MainGroup>
        <SubGroup>son, father</SubGroup>
    </BASIC>
    <ImageSlot>
        <ID>0</ID>
        <POSITION>
            <LeftTop x=400, y=900/>
            <LeftBottom x=400, y=1500/>
            <RightTop x=1300, y=900/>
            <RightBottom x=1300, y=1500/>
        </POSITION>
        <Shape>Rectangle</Shape>
        <PersonGroup>SubGroup</PersonGroup>
    </ImageSlot>
    <ImageSlot>
        <ID>1</ID>
        <POSITION>
            <LeftTop x=700, y=100/>
            <LeftBottom x=700, y=500/>
            <RightTop x=1100, y=100/>
            <RightBottom x=1100, y=500/>
        </POSITION>
        <Shape>ellipse</Shape>
        <PersonGroup>MainGroup</PersonGroup>
    </ImageSlot>
    <ImageSlot>
        <ID>2</ID>
        <POSITION>
            <LeftTop x=1100, y=200/>
            <LeftBottom x=1100, y=600/>
            <RightTop x=1450, y=200/>
            <RightBottom x=1450, y=600/>
        </POSITION>
        <Shape>ellipse</Shape>
        <PersonGroup>MainGroup</PersonGroup>
    </ImageSlot>
    .......
</LayoutInfo>
```

FIG. 27

```xml
<?xml version="1.0" encoding="utf-8" ?>
<LayoutInfo>
        <BASIC>
                <Theme>travel</Theme>
                <PageSize>A4</PageSize>
                <Resolution>300</Resolution>
                <MainGroup>son, mother, father</MainGroup>
        </BASIC>
        <ImageSlot>
                <ID>0</ID>
                <POSITION>
                        <LeftTop x=100, y=200/>
                        <LeftBottom x=100, y=800/>
                        <RightTop x=1000, y=200/>
                        <RightBottom x=1000, y=800/>
                </POSITION>
                <Shape>Rectangle</Shape>
                <PersonGroup>MainGroup</PersonGroup>
        </ImageSlot>
        <ImageSlot>
                <ID>1</ID>
                <POSITION>
                        <LeftTop x=800, y=700/>
                        <LeftBottom x=800, y=1500/>
                        <RightTop x=1700, y=700/>
                        <RightBottom x=1700, y=1500/>
                </POSITION>
                <Shape>Rectangle</Shape>
                <PersonGroup>MainGroup</PersonGroup>
        </ImageSlot>
        <ImageSlot>
                <ID>2</ID>
                <POSITION>
                        <LeftTop x=300, y=1700/>
                        <LeftBottom x=300, y=2300/>
                        <RightTop x=1200, y=1700/>
                        <RightBottom x=1200, y=2300/>
                </POSITION>
                <Shape>Rectangle</Shape>
                <PersonGroup>MainGroup</PersonGroup>
        </ImageSlot>
</LayoutInfo>
```

FIG. 28

```xml
<?xml version="1.0" encoding="utf-8" ?>
<LayoutInfo>
    <BASIC>
            <Theme>growth</Theme>
            <PageSize>A4</PageSize>
            <Resolution>300</Resolution>
            <MainGroup>son</MainGroup>
            <SubGroup>son, father</SubGroup>
    </BASIC>
    <ImageSlot>
            <ID>0</ID>
            <POSITION>
                    <LeftTop x=400, y=900/>
                    <LeftBottom x=400, y=1500/>
                    <RightTop x=1300, y=900/>
                    <RightBottom x=1300, y=1500/>
            </POSITION>
            <Shape>Rectangle</Shape>
            <PersonGroup>SubGroup</PersonGroup>
            <ImageID>0x00000001</ImageID>
            <TrimingCrop x=500, y=0, w=2000, h=2000>
    </ImageSlot>
    <ImageSlot>
            <ID>1</ID>
            <POSITION>
                    <LeftTop x=700, y=100/>
                    <LeftBottom x=700, y=500/>
                    <RightTop x=1100, y=100/>
                    <RightBottom x=1100, y=500/>
            </POSITION>
            <Shape>ellipse</Shape>
            <PersonGroup>MainGroup</PersonGroup>
            <ImageID>0x00000089</ImageID>
            <TrimingCrop x=500, y=0, w=2000, h=2000>
    </ImageSlot>
    <ImageSlot>
            <ID>2</ID>
            <POSITION>
                    <LeftTop x=1100, y=200/>
                    <LeftBottom x=1100, y=600/>
                    <RightTop x=1450, y=200/>
                    <RightBottom x=1450, y=600/>
            </POSITION>
            <Shape>ellipse</Shape>
            <PersonGroup>MainGroup</PersonGroup>
            <ImageID>0x00000129</ImageID>
            <TrimingCrop x=500, y=0, w=2000, h=2000>
    </ImageSlot>
    .......

</LayoutInfo>
```

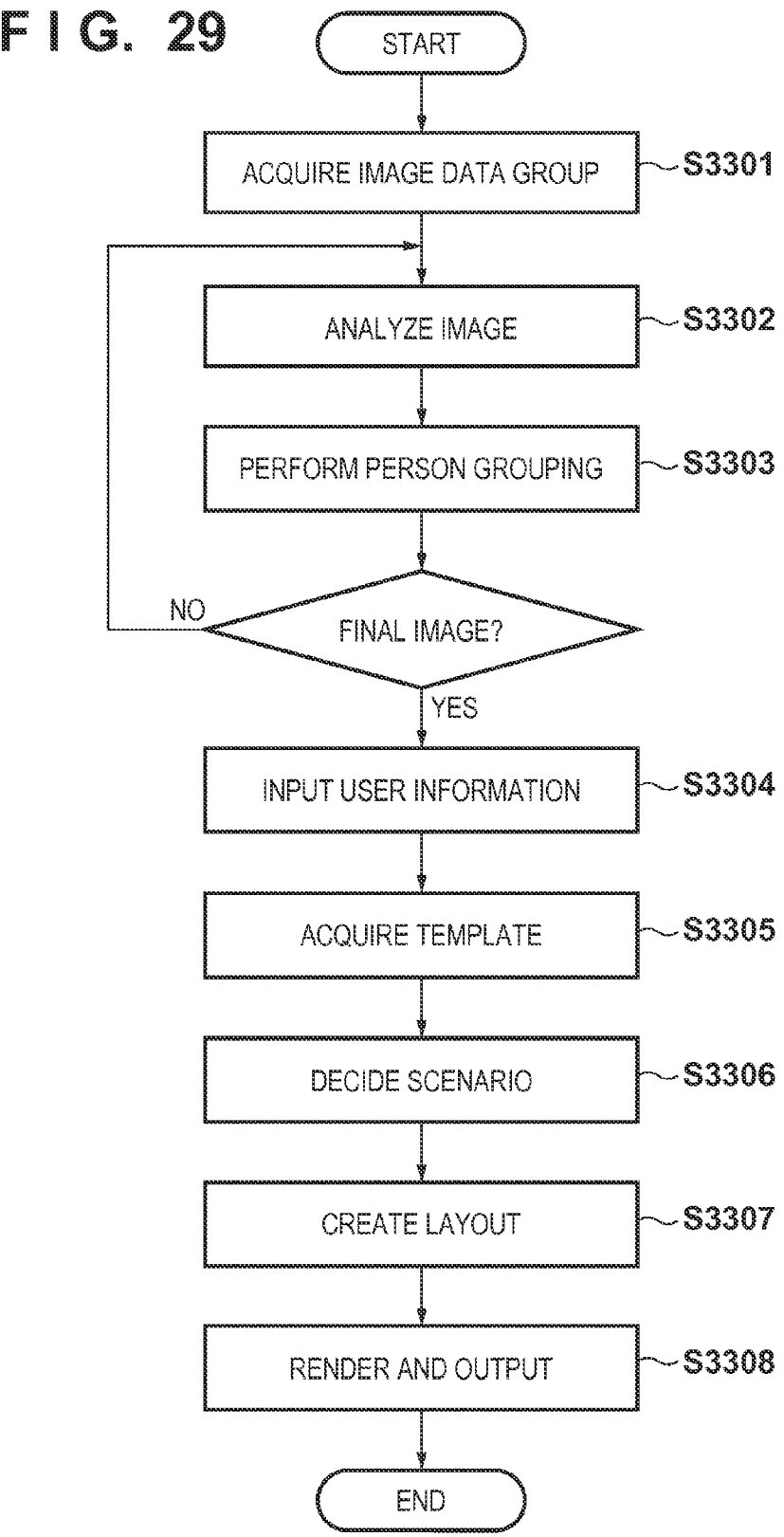

APPARATUS, METHOD, AND NON-TRANSITORY COMPUTER-READABLE MEDIUM

BACKGROUND OF THE INVENTION

1. Field of the Invention

The present invention relates to an apparatus, a method, and a non-transitory computer-readable medium.

2. Description of the Related Art

A technique of automatically insetting an image into a slot of a template and completing a layout image has recently been known in photo printing or video clip creation software. Also known is a technique of preventing an object as a target region from not being output when trimming a region to be arranged in a template frame out of an image to be arranged on a template.

Japanese Patent Laid-Open No. 2007-26246 has the following arrangement. A main object region set on a still image and a target point for deciding the center of the main object are set. In a layout frame, a reference point that is made to match the target point when insetting the still image is set. The ratio of the distance from the reference point to the layout frame to that from the target point to the outline of the still image is obtained. The maximum value of the ratio is defined as a first parameter. In addition, the ratio of the distance from the reference point to the layout frame to that from the target point to the outline of the main object region is obtained. The minimum value of the ratio is defined as a second parameter. When the first parameter is larger than the second parameter, a blank region occurs, or the main object is placed off the album image. Hence, inset of the still image is prohibited.

Japanese Patent Laid-Open No. 2007-26246 describes a technique of automatically deciding the trimming position in consideration of the position of a target region such as a person. In this technique, even when the position of the target region is taken into consideration, and a satisfactory arrangement can be obtained, an unnecessary object such as a passer or a user's finger on the camera is not taken into consideration at all.

When processing is performed for an image 3402 shown in FIG. 30 using the technique described in Japanese Patent Laid-Open No. 2007-26246, a region 3406 of an accidentally included passer is specified together with target regions 3404 and 3405 such as the faces of user's family. In this case, the trimming region is represented by 3409 on the coordinate system of the image 3402. Then, an image 3407 is obtained by performing trimming of the image 3402 using the region 3409. The target regions 3404 and 3405 are displayed in the image 3407 after trimming. However, since the region 3406 corresponding to the passer is displayed together, it may be impossible to output an output target region desired by the user.

SUMMARY OF THE INVENTION

The present invention has been made in consideration of the above-described problem, and provides an image processing apparatus capable of appropriately deciding an output target region in an image, an image processing method, and a non-transitory computer-readable medium.

According to one aspect of the present invention, there is provided an apparatus comprising: a determination unit configured to determine, based on a region that satisfies a predetermined condition in an image as a candidate of an output target, whether to set the region as the output target; and a decision unit configured to, in a case where a plurality of regions that satisfy the predetermined condition exists in the image, decide a portion of the image including one or a plurality of regions determined, out of the plurality of regions, as the output target by the determination unit as a portion of the output target.

According to another aspect of the present invention, there is provided a method comprising: determining, based on a region that satisfies a predetermined condition in an image as a candidate of an output target, whether to set the region as the output target; and in a case where a plurality of regions that satisfy the predetermined condition exists in the image, deciding a portion of the image including one or a plurality of regions determined, out of the plurality of regions, as the output target in the determining as a portion of the output target.

According to the present invention, it is possible to appropriately decide an output target region in an image.

Further features of the present invention will become apparent from the following description of exemplary embodiments (with reference to the attached drawings).

BRIEF DESCRIPTION OF THE DRAWINGS

FIG. 10 is a view showing an example of an image analysis result saving format;

FIG. 13 is a view showing an example of a UI used to manually input person attribute information;

FIG. 14 is a view showing an example of a person attribute information saving format;

FIG. 16 is a view showing an example of the holding format of the layout template shown in FIG. 15;

FIG. 18 is a view showing an example of the holding format of the layout template shown in FIG. 17;

FIG. 19 is a flowchart of automatic layout proposal processing according to the first embodiment;

FIG. 20 is a flowchart of unnecessary image filtering processing according to the first embodiment;

FIG. 21 is a view showing an example of automatic trimming processing;

FIG. 26 is a view showing an example of holding a decided theme and main character information;

FIG. 27 is a view showing an example of holding a decided theme and main character information;

FIG. 28 is a view showing an example of holding generated automatic layout information;

FIG. 29 is an overall flowchart of the first embodiment;

DESCRIPTION OF THE EMBODIMENTS

First Embodiment

An embodiment for automatically generating a layout output matter using an input image group will be described below. This merely exemplifies a form of implementation, and the present invention is not limited to the following embodiment.

Note that in this embodiment, the layout output matter is assumed to be a collage output matter formed from one page for the sake of simplicity. However, the present invention may be applied to single sheet printing or an album output including a plurality of pages.

Figure 1:
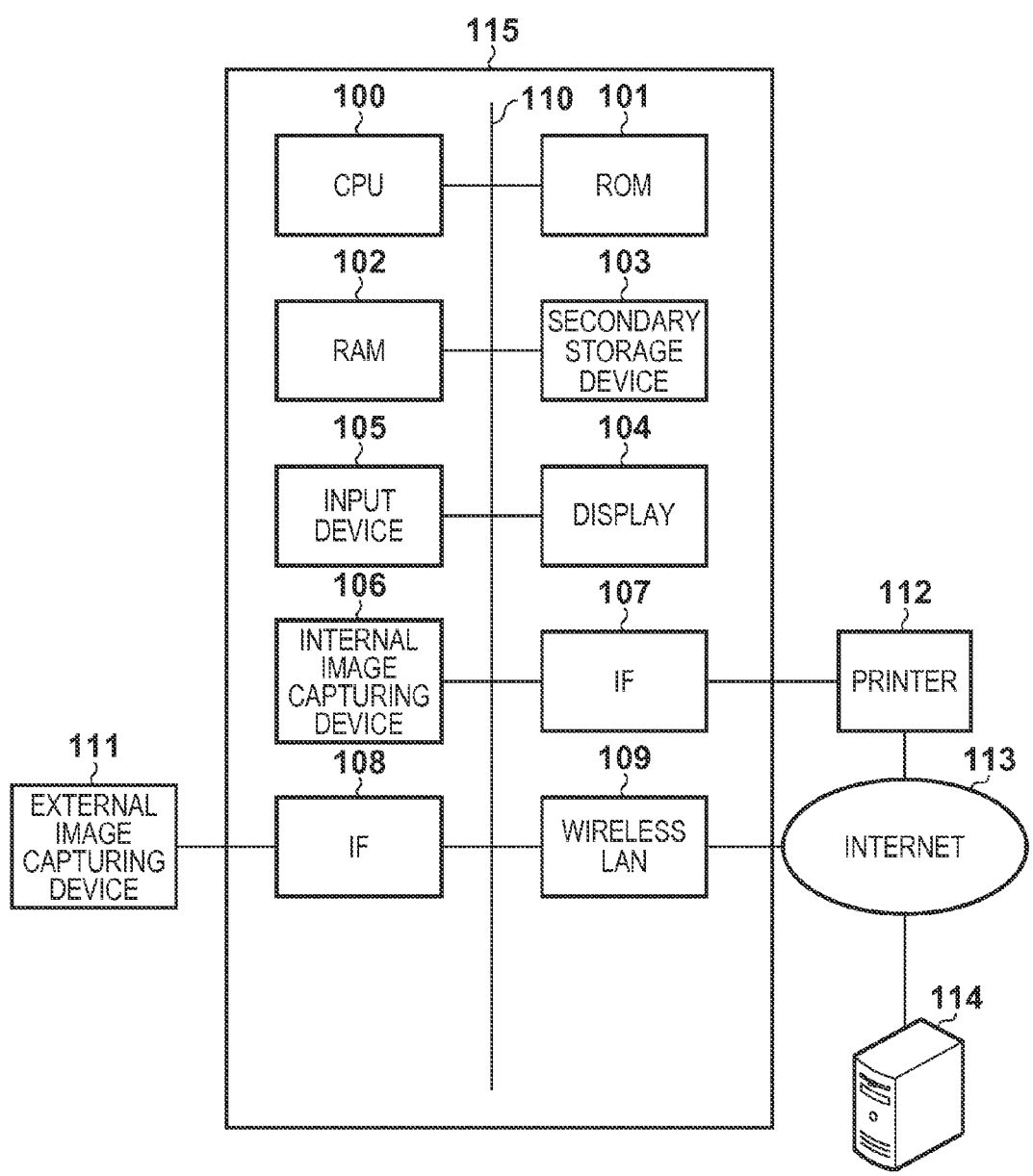
FIG. 1 is a block diagram showing a hardware arrangement capable of executing software of the present invention.

FIG. 1 is a block diagram for explaining an example of the hardware arrangement of an information processing apparatus according to this embodiment. Referring to FIG. 1, an information processing apparatus 115 includes a CPU 100, a ROM 101, a RAM 102, a secondary storage device 103, a display device 104, an input device 105, an IF 107, an IF 108, and a wireless LAN I/F 109. The information processing apparatus also includes an internal image capturing device 106. They are connected to each other via a control bus/data bus 110. The information processing apparatus 115 of this embodiment functions as an image processing apparatus.

Referring to FIG. 1, the CPU (Central Processing Unit) 100 executes an information processing method to be described in this embodiment in accordance with programs such as an application. The ROM 101 stores the programs to be executed by the CPU 100. The RAM 102 provides a memory to temporarily store various kinds of information when the CPU 100 executes the programs. The secondary storage device 103 is formed from a hard disk or the like and serves as a storage medium to save, for example, a database that saves image files and image analysis results. The display device 104 is, for example, a display, and provides the user processing results of this embodiment or various kinds of UIs (User Interfaces) to be described below. The display device 104 may have a touch panel function. The control bus/data bus 110 connects the above-described units to the CPU 100. The information processing apparatus also includes the input device 105 such as a mouse or a keyboard used by the user to input an image correction processing instruction and the like.

The information processing apparatus 115 may include the internal image capturing device 106. An image captured by the internal image capturing device 106 undergoes predetermined image processing and is saved in the secondary storage device 103. The information processing apparatus 115 may load an image from the external image capturing device 111 connected via the interface (IF 108). The information processing apparatus 115 also includes the wireless LAN I/F 109 to be connected to a wireless LAN (Local Area Network). The LAN is connected to the Internet 113. The information processing apparatus 115 can also acquire image data from an external server 114 connected to the Internet 113.

Finally, a printer 112 for outputting an image or the like is connected to the information processing apparatus 115 via the IF 107. Note that the printer 112 is also connected to the Internet 113 so that print data can be transmitted/received via the wireless LAN I/F 109.

Figure 2:
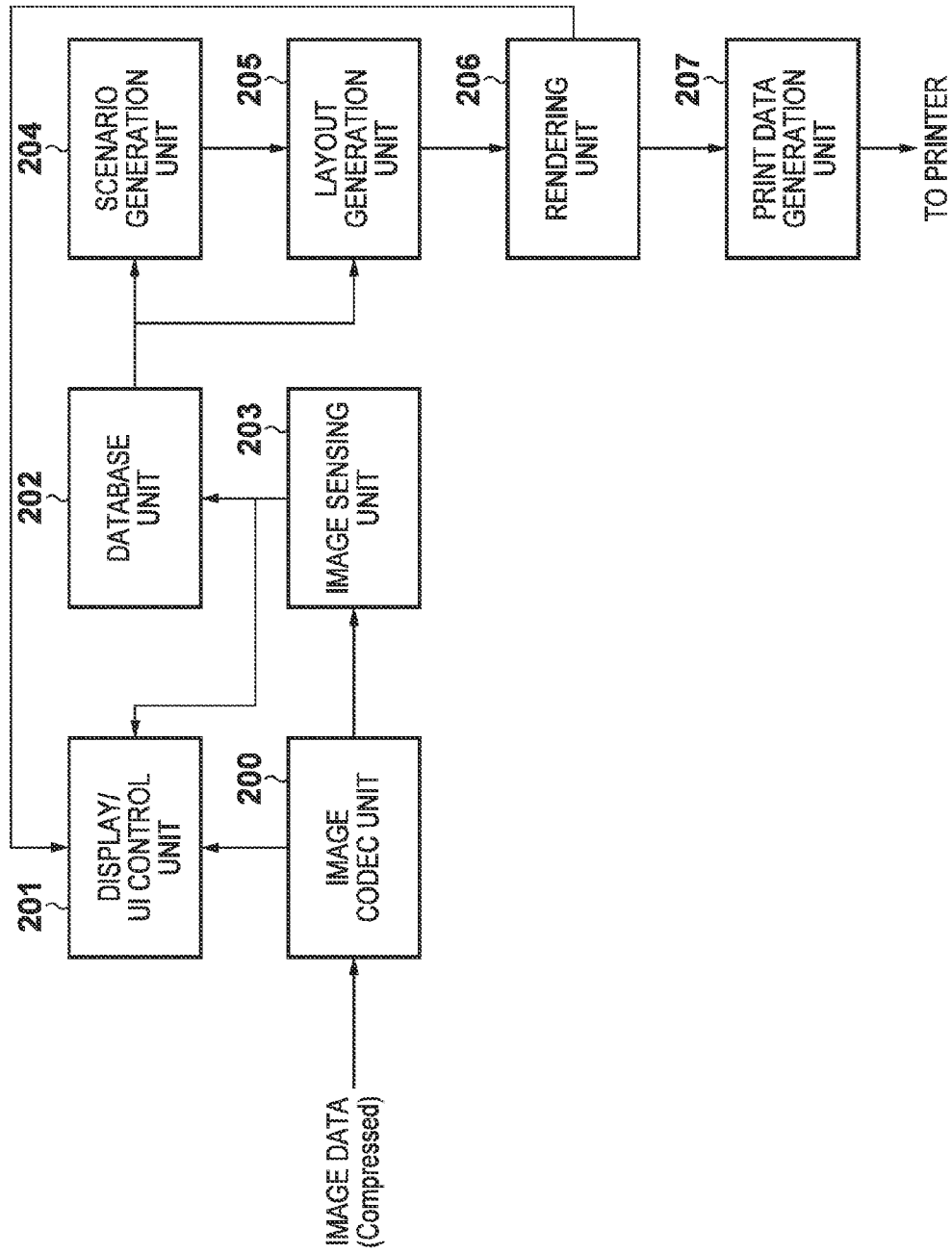
FIG. 2 is a block diagram showing a software configuration of processing of the present invention.

FIG. 2 is a block diagram of a basic software configuration according to this embodiment.

Image data acquired by the information processing apparatus 115 normally has a compression format such as JPEG (Joint Photography Expert Group). Hence, an image codec unit 200 decompresses the compression format and converts it into a so-called RGB dot-sequential bitmap data format. The converted bitmap data is sent to a display/UI control unit 201 and displayed on the display device 104 such as a display.

The bitmap data is also input to an image sensing unit 203 (application). The image sensing unit 203 performs various kinds of analysis processing of the image (details to be described later). Various kinds of attribute information of the image obtained by the analysis processing are saved in the above-described secondary storage device 103 as image information added to the image data by a database unit 202 (application) in accordance with a predetermined format. Note that image analysis processing and sensing processing will be handled in the same sense hereinafter.

A scenario generation unit 204 (application) generates conditions of a layout to be automatically generated in accordance with various conditions input by the user (details will be described later). A layout generation unit 205 performs processing of automatically generating a layout in accordance with the scenario generated by the scenario generation unit 204.

A rendering unit 206 generates the display bitmap data of the layout generated by the layout generation unit 205. The bitmap data is sent to the display/UI control unit 201, and the result is displayed on the display device 104.

The rendering result by the rendering unit 206 is also sent to a print data generation unit 207. The print data generation unit 207 converts the bitmap data into printer command data and sends it to the printer 112.

The flowchart of basic image processing according to this embodiment will be described.

FIG. 29 is a flowchart illustrating the procedure of processing according to this embodiment. In this embodiment, the processing procedure is implemented by causing the CPU 100 to execute programs stored in the ROM 101 or the like.

In step S3301, the CPU 100 acquires an image data group. In this case, for example, image data captured by the user in the past using the external image capturing device 111 and saved in the secondary storage device 103 is obtained as a target, and the file path is acquired. Detailed contents and method will be described later.

In step S3302, the CPU 100 decodes each image of the acquired image data group and performs analysis processing and analysis result database registration. In the analysis processing, the number of person's faces in the image, the coordinate positions of each faces, scene information, and the like are acquired and stored in the database. Detailed contents and method will be described later.

In step S3303, the CPU 100 performs person grouping. Using the information of the faces detected in step S3302, faces having similar feature amounts are put into a group. Detailed contents and method will be described later.

To perform the analysis (step S3302) and the grouping (step S3303) for all images, the CPU 100 repeats steps S3302 and S3303 as many times as the number of images.

In step S3304, the CPU 100 inputs user information. For each face grouped in step S3303, the user inputs a person name, a family relationship, and an attribute such as friend or family using a UI. This will be called person registration. The person-registered face image and the information of each person are held in association with each other. For each face in each group, the coordinates of the face and the image in which the face exists are recorded. This allows the software to obtain who is located at which position of an image. Input of the user's favorite rate for each image and the like are also performed here. Detailed contents and method will be described later.

Figure 15:
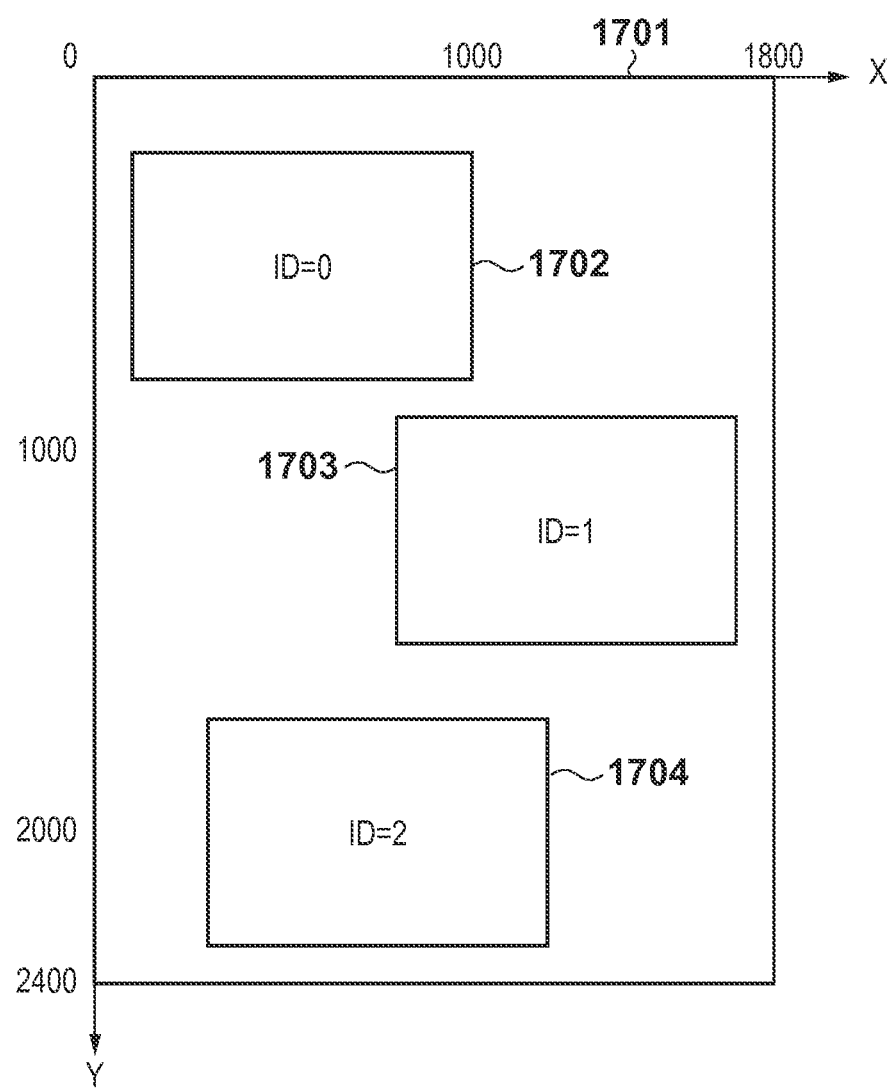
FIG. 15 is a view showing an example of a layout template.
Figure 17:
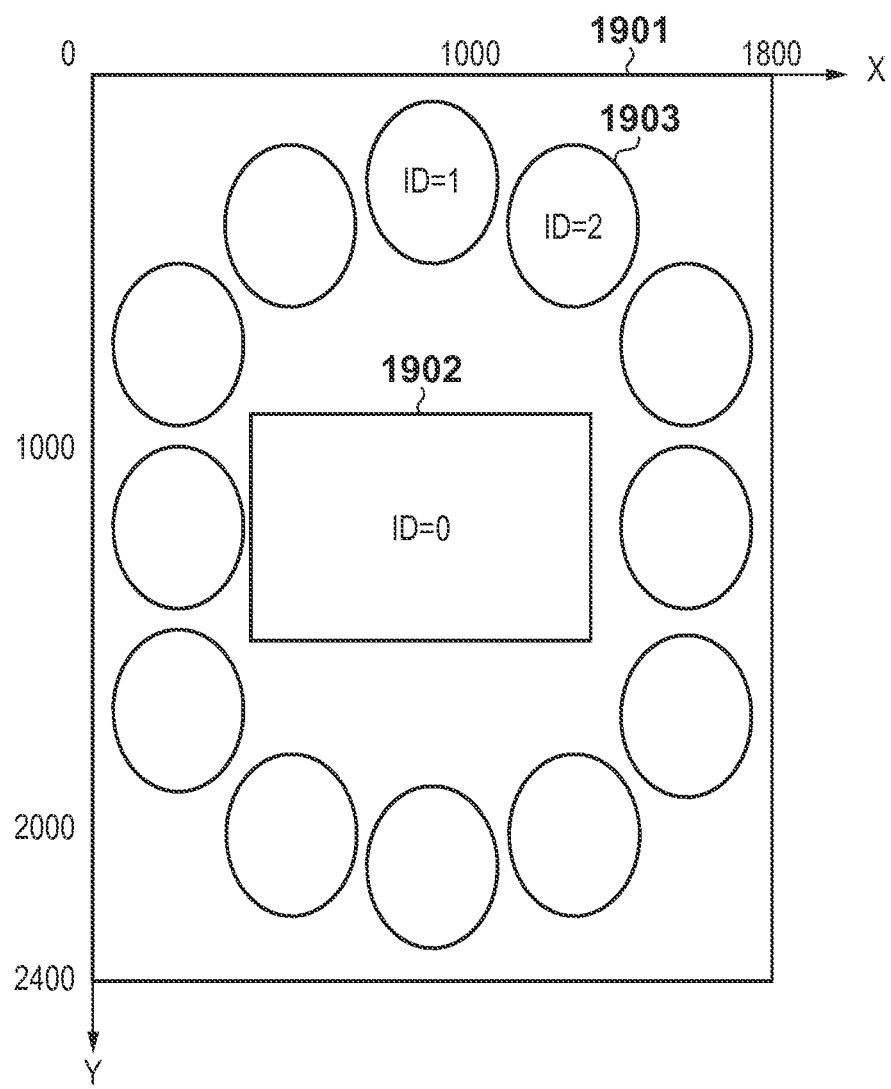
FIG. 17 is a view showing an example of a layout template.

In step S3305, the CPU 100 acquires a template. In this embodiment, various layout templates are assumed to be prepared in advance. Examples of the layout templates are shown in FIGS. 15 and 17.

Figure 32:
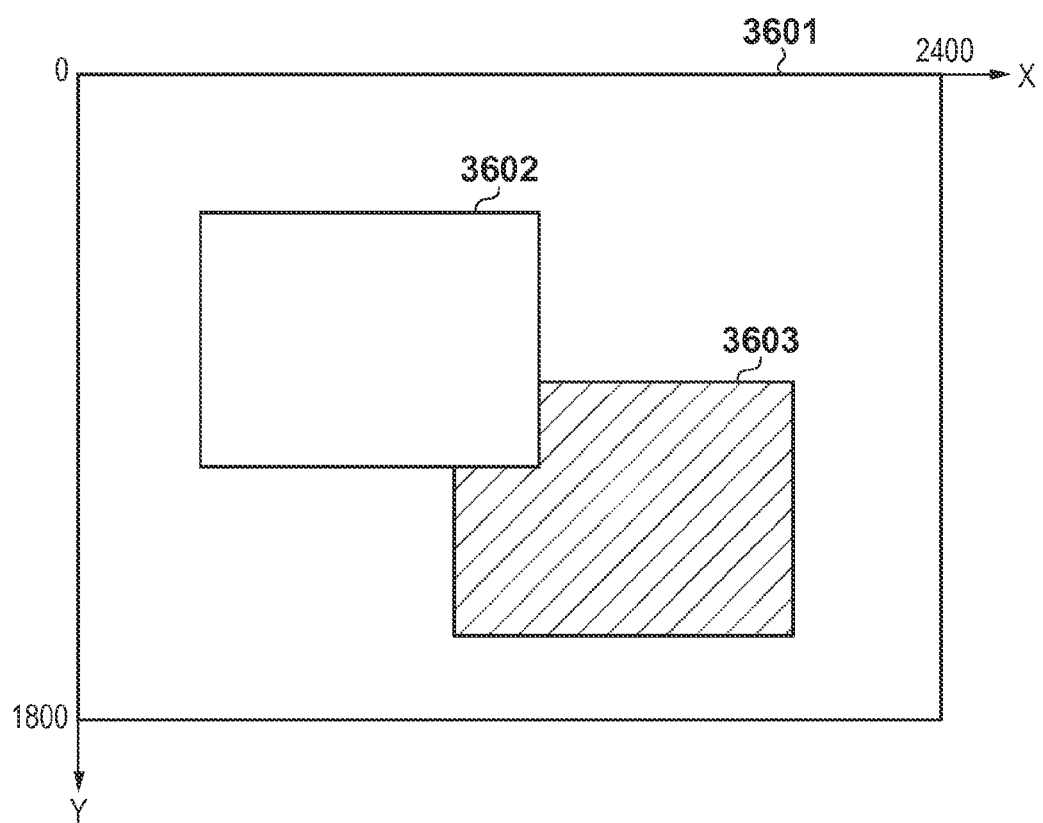
FIG. 32 is a view showing an example of a layout template.

Note that reference numerals 1702, 1703, 1704, and 1903 in these drawings denote image arrangement regions to arrange images, which are called slots in the templates. Each slot has a predetermined size. In FIG. 32, slots 3602 and 3603 overlap each other. Out of such overlapping slots, the slot 3603 on the lower side of the overlap has the hatched portion as the image arrangement region. Details of the templates will be described later.

In step S3306, the CPU 100 decides the scenario of proposal processing. The scenario includes the theme of the layout to be proposed, decision of a template, settings of a person (main character) to be emphasized in the layout, and selection information of an image group to be used for layout generation. Note that the user may manually select and designate the scenario using a UI. Detailed contents and method will be described later.

In step S3307, the CPU 100 performs image selection, temporary layout generation, and layout evaluation based on the above-described scenario. In the image selection, the luminance and the like are evaluated, and filtering is performed to exclude unnecessary images. Candidate images to be used in a temporary layout are thus selected. Details of the selection method will be described later.

In the temporary layout generation, processing of arbitrarily applying the images that have undergone the filtering above to the image arrangement frames of the acquired template is repeated to generate an enormous number of temporary layouts. In this case, layouts in which trimmed images are arranged in the slots are output. Details of the temporary layout generation will be described later.

In the layout evaluation, each of the enormous number of temporary layouts generated above is evaluated. In the evaluation, the individual evaluation value of each image, the matching between an image and a slot, the balance in each layout page, and the like are calculated and integrated to obtain an evaluation value.

In this embodiment, unnecessary region presence evaluation is performed as one of the evaluation items of the matching between an image and a slot. "Unnecessary region presence evaluation" evaluates the degree of presence of an unnecessary region in an image actually arranged in a slot that is an image arrangement region. The smaller the unnecessary region is, the higher the evaluation is.

"Unnecessary region" is an obstructive region that makes the image poor when displayed, for example, a region of an unrelated person who is passing by or a region of a user's finger unintentionally placed on the camera lens and shot. An unrelated person indicates, for example, a person other than friends, acquaintances, and family.

As an example of determining whether a person is an unrelated person or not, the following method is usable.

A person having a face detected by sensing but not registered by the user

A person whose appearance frequency is low in the image group held by the user

A region that is continuous from a face region can be guessed to be a body based on the coordinates, orientation, and size of the face. For example, the body is guessed as a region having a length (height) 8 times the face length and a width 4 times. The face of a person determined as an unrelated person and his/her guessed body portion may also be included in the unnecessary region. The above-described processing makes it possible to automatically determine the unnecessary region once image group sensing or person registration is performed.

Note that a person whose appearance frequency is high in the image group analyzed by the software is not determined as the unnecessary region even if person registration is not performed. This can prevent any adverse effect caused by a failure in person registration.

As the appearance frequency, a degree by which a person of each person group generated by recognizing the person as the same person by personal recognition appears in the image group is calculated. Alternatively, the appearance frequency may be determined as high for a person whose appearance count exceeds a predetermined threshold or low for a person whose appearance count does not exceed the threshold. A number of images shot in a short time by continuous shooting or the like include many passers. For this reason, an accurate appearance frequency can be calculated by controlling the appearance count in consideration of the time interval.

The following persons can be unnecessary region candidates.

A person out of focus

A person whose face size is smaller than a predetermined threshold

A person included at a distance far from a person in a target region to be described later A person whose face size is much different from that of a person in a target region A person whose facial expression is different from that of a person in a target region A person who can be guessed as an unrelated person depending on a person in a target region and the relationship to his/her face orientation A person who can be guessed as an unrelated person depending on a person in a target region and the relationship to his/her moving direction Since the user focuses the main object, a person out of focus or in a small size may be unnecessary. In addition, since the target region to be described later is the main object, whether a person is necessary can be guessed based on the relationship to the main object.

The distance of the person from the person in the target region at the time of shooting can be guessed based on the coordinate positions of the image and the face size (the positional relationship between regions, and the like). For example, a family, friends, or a couple are often included at distances short to some extent. Hence, a person included far apart from the persons in the target region is an unrelated person at a high possibility. As examples of calculation of the distance in the depth direction, the following methods are usable: a method of guessing the distance from the face size, a method of determining an equidistance from parts whose parallactic distances match in a twin-lens camera, and a method of, in a camera capable of shooting a plurality of focus positions by one shooting process, obtaining objects that are in focus at the same focal position as equidistant objects.

Persons having some relationship (to be referred to as related persons hereinafter) share the same time. If a person has the same facial expression, for example, the same smiling face as that of the person in the target region as the main object, he/she is a related person at a high possibility. Conversely, if the facial expression is different, he/she is an unrelated person at a high possibility. To determine the facial expression, a known method such as a technique described in, for example, Japanese Patent Laid-Open No. 2005-44330 is used.

A person who is looking in the same direction as the person in the target region, a person facing the person in the target region, or a person who is looking into the camera is a related person at a high possibility. A person who is looking in a different direction is an unrelated person at a high possibility. The direction in which a person is looking can be guessed from the position of a face organ such as an eye or calculated using a known technique such as eye-gaze determination.

When an image is extracted from a moving image, or a plurality of still images are shot by continuous shooting or the like within a time short to some extent, the moving vector of the object can be known from the relationship of preceding and subsequent frames. Using this, a person who is moving in a direction to move away from the person in the target region or in an unrelated direction is determined as an unrelated person at a high possibility. To obtain the moving vector, a known method such as block matching is used.

As another method, a person registered by the user as an unrelated person or a person for whom an ignore command is designated may be determined as an unrelated person. That is, an unnecessary region and a target region supposedly include objects having little association. The user may designate an unnecessary region using a UI such as a mouse, a keyboard, or a touch panel.

The unnecessary region is not limited to a person and may be an object at rest such as a car, a building, or a mountain or an animal.

Whether a region is an unnecessary region may be determined using a plurality of items as the base of the above-described unnecessary region determination. For example, the items are given weights, added, and averaged to calculate a score, and the score is compared with a threshold predetermined or set by the user. As another method, determination may be performed by a known method such as AdaBoost while using each item as a determiner.

In this embodiment, a target region is used. The target region is a wanted region such as coordinates at which a person registered by the user is included. A body may be guessed from the coordinates, orientation, and size of a face, and the guessed body may also be included in the target region.

The following persons can be target region candidates due to a reason reverse to the above-described unnecessary region determination.

A person in focus

A person whose face size is larger than a predetermined threshold

A person included at a distance close to a person in a target region to be described later A person whose face size is almost equal to that of a person in a target region A person whose facial expression is the same as that of a person in a target region A person who can be guessed as a related person depending on a person in a target region and the relationship to his/her face orientation A person who can be guessed as a related person depending on a person in a target region and the relationship to his/her moving direction As in the unnecessary region determination, whether a region is a target region may be determined using the plurality of items.

Note that as another example, a region designated by the user as the target region using a UI such as a mouse or a keyboard or a person whose person attribute is family or friend may be determined as the target region. Details of the target region use method will be described later.

Figure 30:
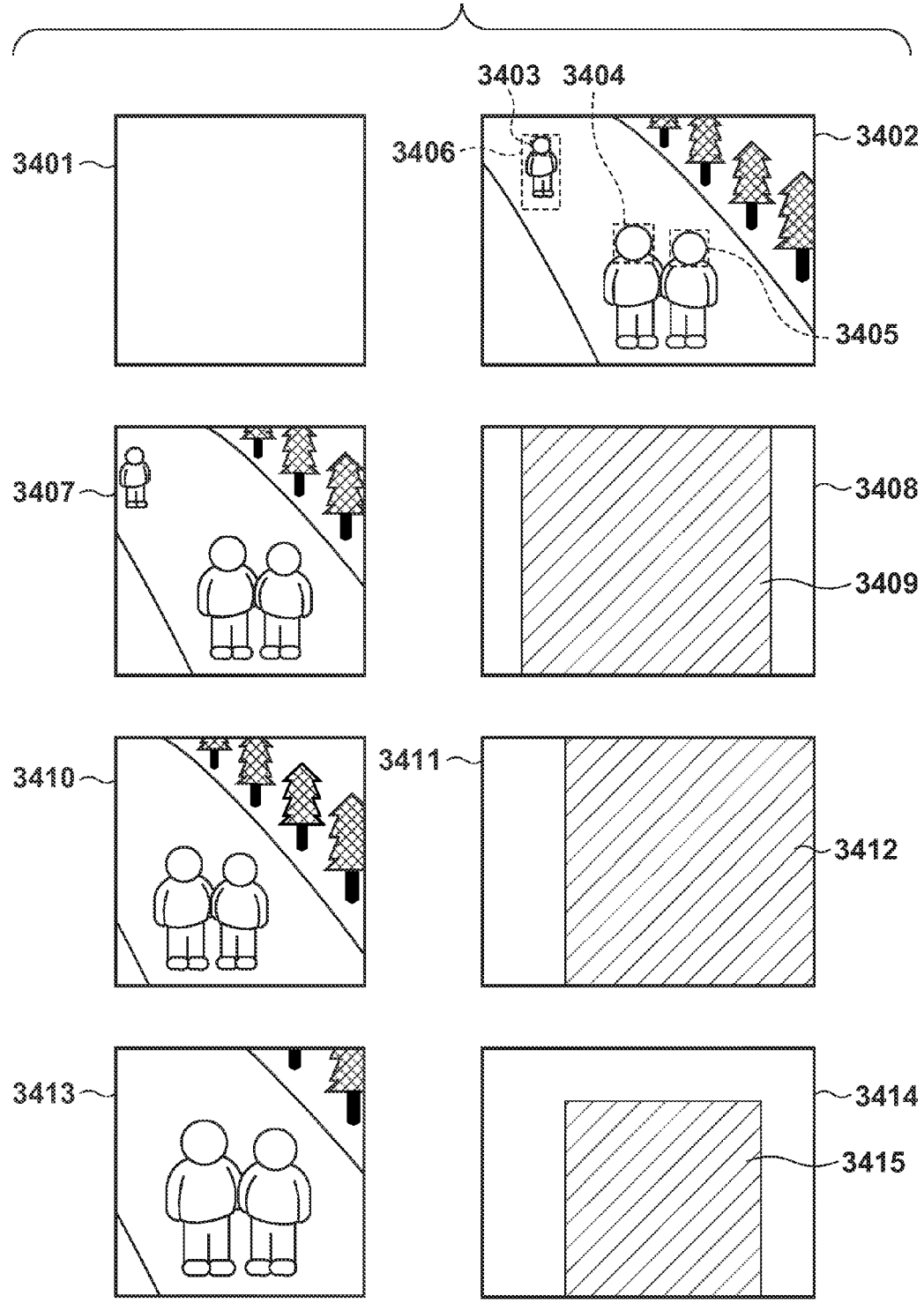
FIG. 30 is a view showing an example of automatic trimming processing.

Reference numeral 3401 in FIG. 30 represents the slot 1704 in FIG. 15. As described above, the slot is a region to arrange an image. Reference numeral 3402 denotes an image to be arranged in the slot 3401. The image 3402 includes an unnecessary region 3406 (inside the dotted line). Note that reference numerals 3403, 3404, and 3405 denote face regions detected and specified by sensing. In this embodiment, the faces 3404 and 3405 indicated by the broken lines are target regions of persons registered by the user.

Reference numerals 3408, 3411, and 3414 denote figures representing the coordinates of the image 3402. The hatched portions indicate trimming regions 3409, 3412, and 3415. The trimming regions have the same aspect ratio as that of the slot 3401. If a trimming region has an aspect ratio different from that of the slot, margins occur in the slot after image arrangement, and the image may look poor.

The trimming region 3409 almost arranges the center of the image in the slot 3401. When the image 3402 is trimmed by the region 3409 in 3408, an image as indicated by 3407 is obtained. In 3407, the unnecessary region 3406 is displayed in the slot. In the present invention, the evaluation value of unnecessary region presence evaluation is set low in such a case. In this embodiment, the following method is used to obtain the unnecessary region presence evaluation value. It is determined whether the unnecessary region is included in the trimming region as indicated by 3409. If at least part of the unnecessary region is included, the evaluation value is set to 0. If the unnecessary region is not included at all, the evaluation value is set to 100. As another embodiment, the ratio of an area (display area ratio) where the unnecessary region is displayed in the slot may be calculated, and the evaluation value may be decided in accordance with the display area ratio. The lower the display area ratio is, the higher the evaluation value is set. For example, the evaluation value is obtained by evaluation value=100−display area ratio [%]

A threshold may be provided for the display area ratio, and the evaluation value may be set to 100 if the display area ratio is lower than the threshold or 0 if the display area ratio is equal to or higher than the threshold.

Note that in 3408 and 3409 representing the trimming positions of the image 3402, the display area ratio is obtained by counting the number of pixels overlapping in the trimming region 3408 and the unnecessary region 3406 and dividing the result by the number of pixels of the trimming region 3409. When the target region and the trimming region are rectangular, the numerical value may be calculated using the coordinates to obtain the display area ratio.

When the unnecessary region is not included in the image, the evaluation value is 100.

Evaluation is performed for 3407 in which the trimming represented by 3408 and 3409 is performed for the image

3402. Since the unnecessary region 3406 is displayed, the unnecessary region presence evaluation value is 0.

An example of trimming represented by 3411 and 3412 for the image 3402 will be described next. When the trimming is performed, the slot changes as indicated by 3410. Evaluation is performed in the same way as described above. Since the unnecessary region 3406 is not displayed in 3410, the unnecessary region presence evaluation value is 100.

Similarly, an example of trimming represented by 3414 and 3415 for the image 3402 will be described. When the trimming is performed, the slot changes as indicated by 3413. Since the area of the unnecessary region 3406 displayed in 3413 is 0 [%] upon evaluation, the unnecessary region presence evaluation value is 100.

3407 in which the unnecessary region presence evaluation value is 0 is compared with 3410 and 3413 in which the unnecessary region presence evaluation value is 100. The target regions 3404 and 3405 are displayed in all of them. However, the passer 3406 is also displayed in 3407. Focus should be placed on the target regions 3404 and 3405 corresponding to registered persons such as family. In 3407, however, since the unnecessary passer is included, attention is diverted from the registered persons to some extent. On the other hand, in 3410 and 3413, the passer 3406 is not displayed, and the registered persons attract attention. As described above, the unnecessary region presence evaluation value is an element used to decide a satisfactory trimming position in an image including an unnecessary object. Trimming that eliminates the unnecessary region, that is, makes the unnecessary region absent in the image arrangement region is evaluated highly and preferentially employed.

Figure 31:
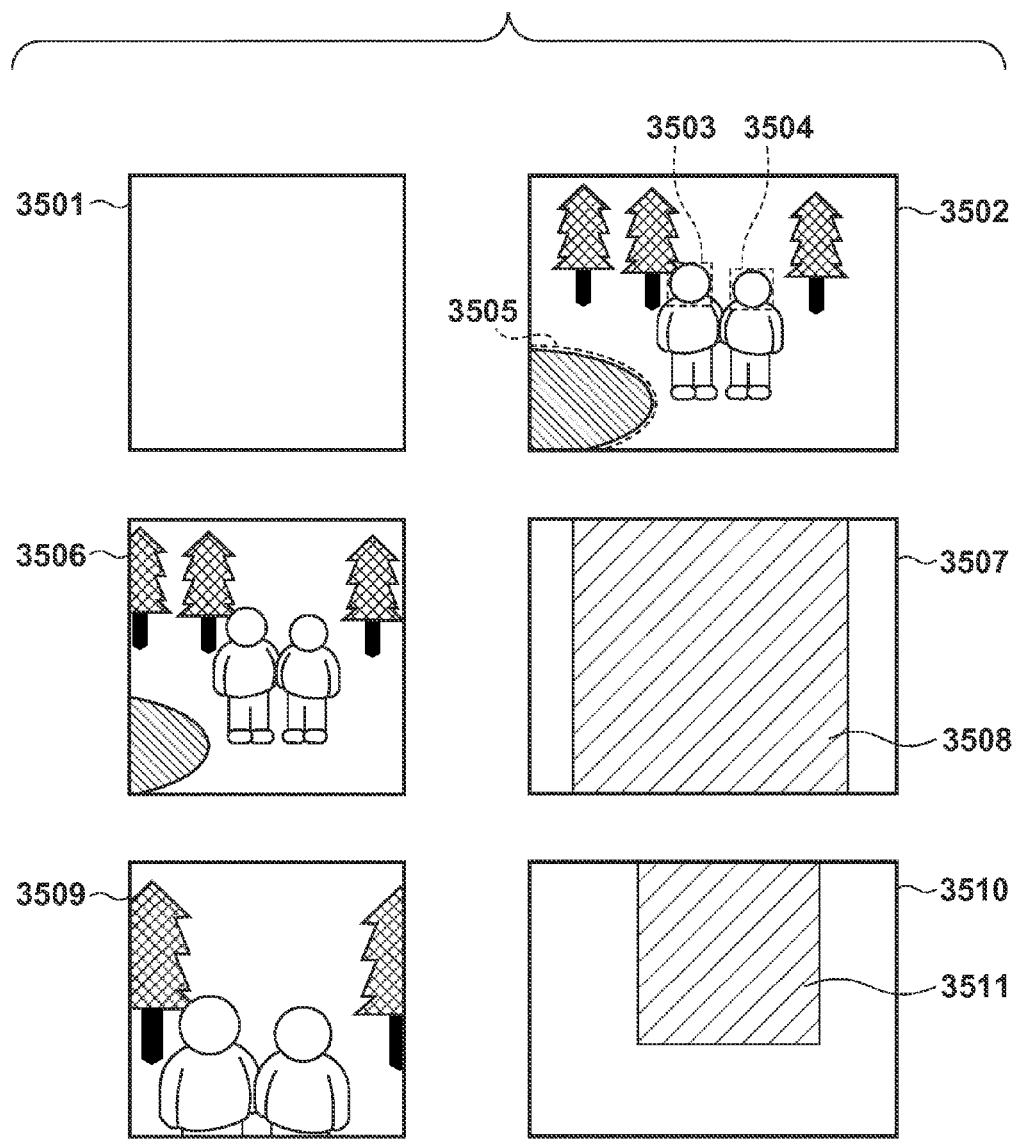
FIG. 31 is a view showing an example of automatic trimming processing.

Another example will be described with reference to FIG. 31. Reference numeral 3501 in FIG. 31 represents the slot 1704 in FIG. 15; and 3502, an image to be arranged in the slot 3501. The image 3502 includes an unnecessary region 3505 (inside the dotted line). The unnecessary region 3505 represents a user's finger placed on the lens by mistake at the time of shooting, and is registered as an unnecessary region in advance by the user using a UI. Note that broken lines 3503 and 3504 indicate face regions detected by sensing. In this embodiment, the faces indicated by the broken lines 3503 and 3504 are target regions of persons registered by the user.

Reference numerals 3507 and 3510 denote figures representing the coordinates of the image 3502. Hatched portions 3508 and 3511 indicate trimming regions. The trimming regions have the same aspect ratio as that of the slot 3501.

When the trimming is performed for the image 3502 by the region 3508 in 3507, the slot changes as indicated by 3506. In 3506, since the unnecessary region 3505 is displayed in the slot, the unnecessary region presence evaluation value is 0.

When the trimming is performed for the image 3502 by the region 3511 in 3510, the slot changes as indicated by 3509. In 3509, since the unnecessary region is not displayed in the slot at all, the unnecessary region presence evaluation value is 100.

When the unnecessary region presence evaluation is performed, and the evaluation value is used, as will be described later, an arrangement that includes an unnecessary object and is therefore inappropriate as a layout is hardly obtained.

In step S3307 of FIG. 29, the unnecessary region presence evaluation value and other evaluation values of the respective categories are obtained for the layout and integrated by weighted summing to obtain the evaluation value of the layout. Methods of outputting the other evaluation values will be described later.

In step S3308 of FIG. 29, rendering and output are performed. The layout result obtained by the above-described processing is rendered, and the result is displayed on the display. After the display, the user may modify the trimming position using the input device 105.

As described above, when the trimming position is evaluated in consideration of the unnecessary region, trimming that includes an unnecessary object and gives unfavorable impression hardly occurs.

Note that in this embodiment, a person who is not registered is determined as an unnecessary region. However, in an image including too many passers or the like, the persons may be exempted from the unnecessary region determination. For example, in an image shot in a crowd at the city center, the passers can also be part of the scene. For example, if the number of passers is N times or more the number of target regions, the unnecessary region presence evaluation value is set to 100. N is an arbitrary value.

Details of each step according to this embodiment will be described below.

Figure 3:
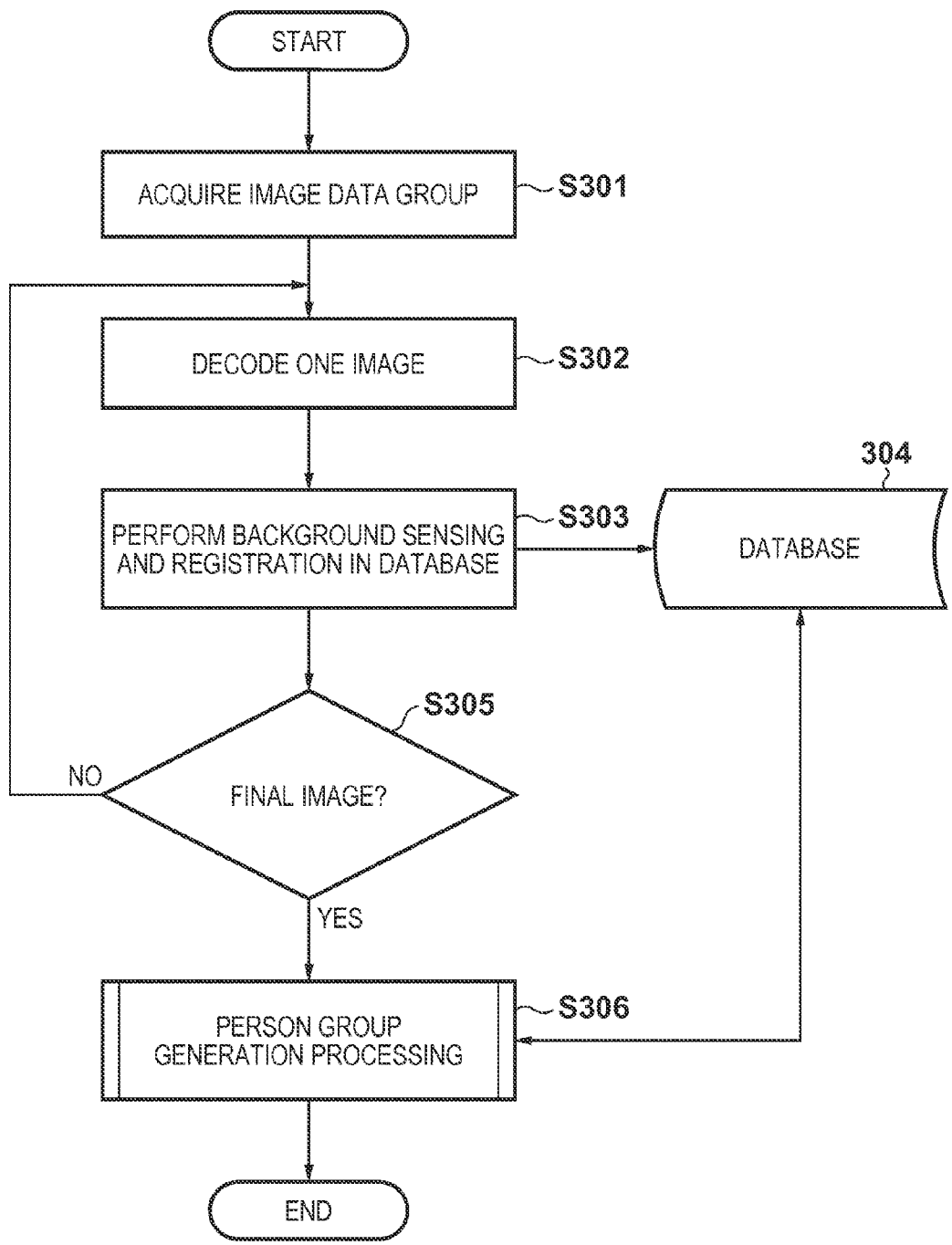
FIG. 3 is a flowchart of image analysis processing.
Figure 4:
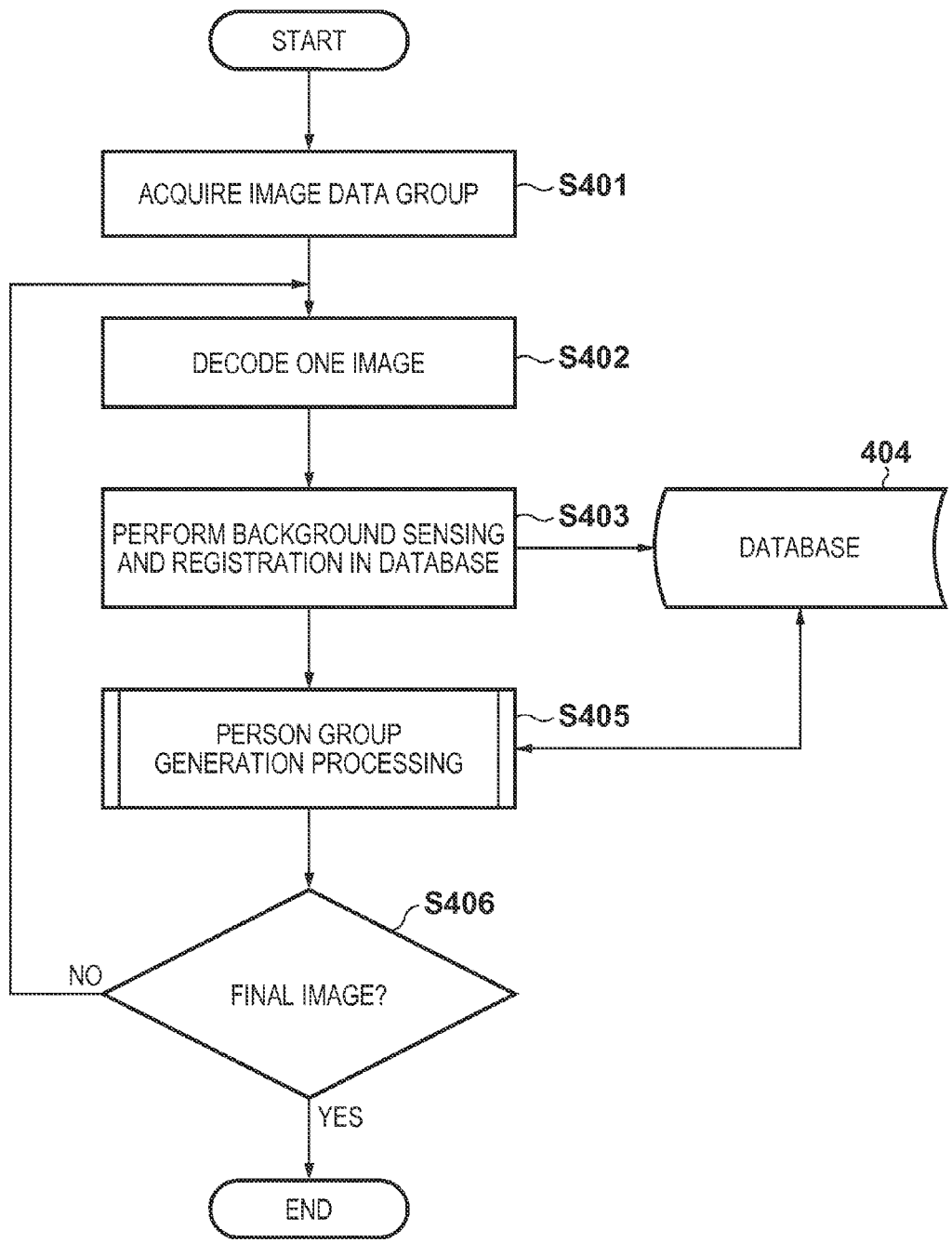
FIG. 4 is a flowchart of image analysis processing.

FIGS. 3 and 4 illustrate the procedure of the image sensing unit 203 or the procedure of acquiring a plurality of image data groups, performing analysis processing for each of them, and storing the result in the database. The processes shown in FIGS. 3 and 4 correspond to the processes of steps S3301 to S3303 in FIG. 29.

The flowchart of processing executed by the image sensing unit 203 will be described first with reference to FIG. 3.

In step S301, an image data group is acquired. To acquire the image data group, for example, the user connects an image capturing apparatus or memory card storing shot images to the information processing apparatus 115, thereby loading the captured images. Images shot by the internal image capturing device 106 and saved in the secondary storage device 103 are also included in the acquisition target, as a matter of course. Alternatively, the images may be acquired from an apparatus other than the information processing apparatus 115, for example, the external server 114 connected to the Internet 113 via the wireless LAN I/F 109.

Figure 8:
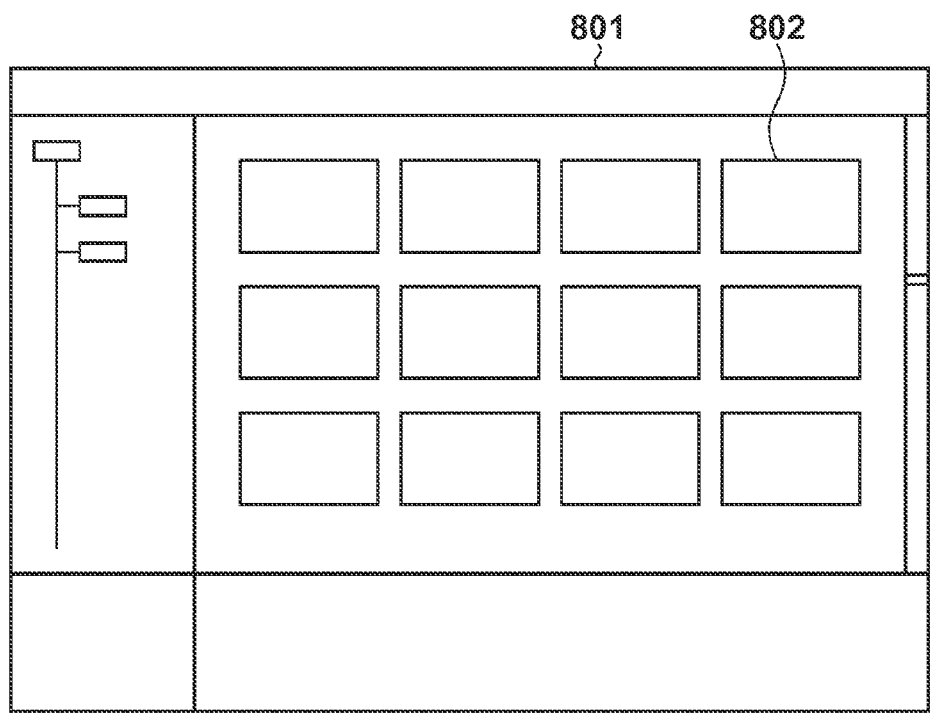
FIG. 8 is a view showing a display example of an image group in a thumbnail format.
Figure 9:
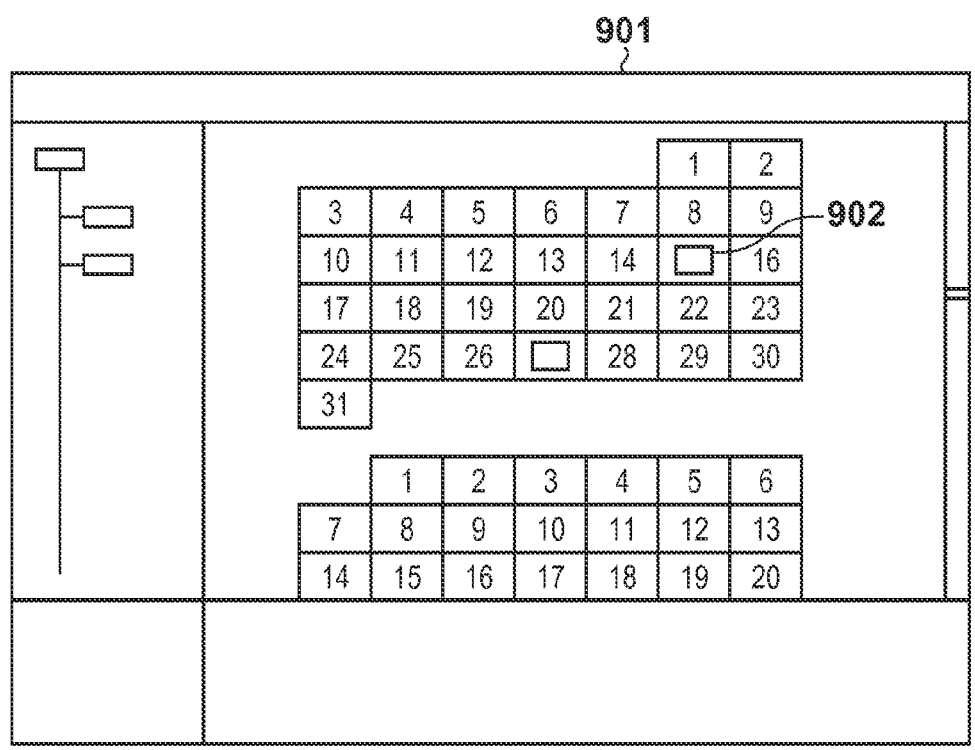
FIG. 9 is a view showing a display example of an image group in a calendar format.

Display of the display device 104 at the time of image data group acquisition will be described here with reference to FIGS. 8 and 9. When an image data group is acquired, a UI on the display device 104 displays a thumbnail group corresponding to the image data group so that the user can confirm the images based on the acquired image data, as shown in FIG. 8 or 9. The display method of the UI on the display device 104 is not particularly limited as long as the images can be confirmed. For example, a UI 801 may display thumbnails 802 of the images for each folder in the secondary storage device 103, as shown in FIG. 8. Alternatively, the image data may be managed for each date on a UI 901 using a calendar format, as shown in FIG. 9. When the user clicks on a date portion 902 in the UI 901 shown in FIG. 9, images shot that day are displayed in a thumbnail list, as in the UI 801 shown in FIG. 8.

In steps S302 to S305 of the flowchart shown in FIG. 3, analysis processing and analysis result database registration are performed for each acquired image data group.

More specifically, in step S302, each image is decoded. First, the image sensing unit 203 (application) searches for an image newly saved and yet to undergo sensing processing. The codec unit converts each extracted image from compressed data to bitmap data.

In step S303, various kinds of sensing processing are executed for the converted bitmap data to acquire sensing information, and the sensing information is registered in the database. Table 1 shows an example of attribute information obtained by image analysis. The sensing processing is assumed to include various kinds of processing as shown in Table 1. In this embodiment, face detection, face region feature amount analysis, image feature amount analysis, and scene analysis are performed as examples of the sensing processing, and results of data types as shown in Table 1 are calculated. In this embodiment, average luminance (int: value 0 to 255), average saturation (int: value 0 to 255), and average hue (int: value 0 to 359) are analyzed as the basic image feature amounts. In addition, the number of person's faces (int: value 0 or more (0 to MAXFACE)) and coordinate positions (int*8: value 0 or more (0 to Width or Height)) representing the position information of each person's face are analyzed as face detection. Furthermore, the average Y (int: value 0 to 255) in a face region, the average Cb (int: value −128 to 127) in a face region, and the average Cr (int: value −128 to 127) in a face region are analyzed.

TABLE 1

| Sensing classification | Sensing sub-classification | Data type | Value |
|---|---|---|---|
| basic image feature amount | average luminance | int | 0 to 255 |
| | average saturation | int | 0 to 255 |
| | average hue | int | 0 to 359 |
| face detection | number of person's faces | int | 0 to MAXFACE |
| | coordinate position | int*8 | 0 to Width or Height |
| | average Y in face region | int | 0 to 255 |
| | average Cb in face region | int | −128 to 127 |
| | average Cr in face region | int | −128 to 127 |
| scene analysis | scene result | char | Landscape Nightscape Portrait Underexposure Others |

Each sensing processing will be explained below.

The average luminance and the average saturation of an entire image, which are the basic image feature amounts, can be obtained by a known method and will therefore be described briefly. For the average luminance, the R, G, and B components of each pixel of the image are converted into known luminance and color difference components (for example, Y, Cb, and Cr components), and the average value of the Y components is obtained. For the average saturation, the Cb and Cr components are calculated for each pixel, and the average value of S is obtained by $$S=\sqrt{Cb^2+Cr^2}$$

The average hue (AveH) in an image is a feature amount to evaluate the tone of the image. The hue of each pixel can be obtained using a known HIS conversion formula. The values are averaged in the entire image, thereby obtaining AveH.

The feature amounts may be calculated for the entire image. Alternatively, for example, the image may be divided into regions having a predetermined size, and the feature amounts may be calculated for each region.

Person's face detection processing will be described next. Various methods are usable as the person's face detection method according to this embodiment. According to a method described in Japanese Patent Laid-Open No. 2002-183731, an eye region is detected from an input image, and a region around the eye region is set as a face candidate region. The luminance gradient and the weight of the luminance gradient are calculated for the detected face candidate region. These values are compared with the gradient and the gradient weight of a preset ideal reference face image. At this time, when the average angle between the gradients is equal to or smaller than a predetermined threshold, the input image is determined to have a face region.

According to a method described in Japanese Patent Laid-Open No. 2003-30667, a flesh color region is detected from an image. A human iris color pixel is then detected in the flesh color region, thereby detecting the position of an eye.

According to a method described in Japanese Patent Laid-Open No. 8-63597, the level of matching between an image and each of a plurality of templates of face shapes is calculated. A template having the highest matching level is selected. If the highest matching level is equal to or more than a predetermined threshold, the region in the selected template is set as a face candidate region. Using this template makes it possible to detect the position of an eye.

According to a method described in Japanese Patent Laid-Open No. 2000-105829, an entire image or a designated region of an image is scanned using a nose image pattern as a template. A position that matches the template most is output as the position of the nose. Next, a region above the nose position in the image is assumed to be a region where the eyes exist. The eye existence region is scanned using an eye image pattern as a template, and matching is calculated. An eye existence candidate position set that is a set of pixels whose matching levels are higher than a threshold is obtained. In addition, a continuous region included in the eye existence candidate position set is divided into clusters. The distance between each cluster and the nose position is calculated. A cluster having the shortest distance is decided to be a cluster including an eye, thereby detecting the organ position.

As other face detection processing methods, for example, known methods of detecting a face and organ positions to be described below may be used. For example, Japanese Patent Laid-Open Nos. 8-77334, 2001-216515, 5-197793, 11-53525, 2000-132688, 2000-235648, and 11-250267 are usable. In addition, Japanese Patent No. 2541688 is usable.

As a result of the above-described processing, the number of human faces and the coordinate positions of each face can be acquired.

Once face coordinate positions in an image are known, the average luminance and the average color difference of the face region can be obtained by calculating, for each face region, the average Y, Cb, and Cr values of pixel values included in the face region.

Scene analysis processing can be performed using the feature amount of an image. For the scene analysis processing, a method disclosed in, for example, Japanese Patent Laid-Open No. 2010-251999 or 2010-273144 may be used. Note that a detailed description of these techniques will be omitted here. The scene analysis can acquire an ID to distinguish the shooting scene such as Landscape, Nightscape, Portrait, Underexposure, and Others.

Note that the sensing information is not limited to that acquired by the above-described sensing processing, and any other sensing information may be used.

The sensing information acquired in the above-described manner is saved in the database unit 202. The saving format in the database unit 202 is not particularly limited. The sensing information is described using, for example, a general-purpose format (for example, XML: eXtensible Markup Language) as shown in FIG. 10 and stored.

FIG. 10 shows an example in which the attribute information of each image is classified into three categories and described. The first BaseInfo tag is information added to an acquired image file in advance and representing the image size and shooting time information. This tag includes the identifier ID of each image, the save location where the image file is stored, the image size, and the shooting date/time.

The second SensInfo tag is used to store the result of the above-described image analysis processing. The average luminance, average saturation, and average hue of the entire image and the scene analysis result are stored. In addition, information associated with the face position and face color of each person existing in the image can be described.

The third UserInfo tag can store information input by the user for each image. Details will be described later.

Note that the method of storing image attribute information in the database is not limited to that described above, and any other known format is usable.

Next, in step S306 of FIG. 3, person grouping using personal recognition processing is performed. In this case, processing of generating a group for each person using the face position information detected in step S303 is performed. Automatically grouping person's faces in advance makes it possible to increase the efficiency of the user's operation of naming each person later.

Figure 5:
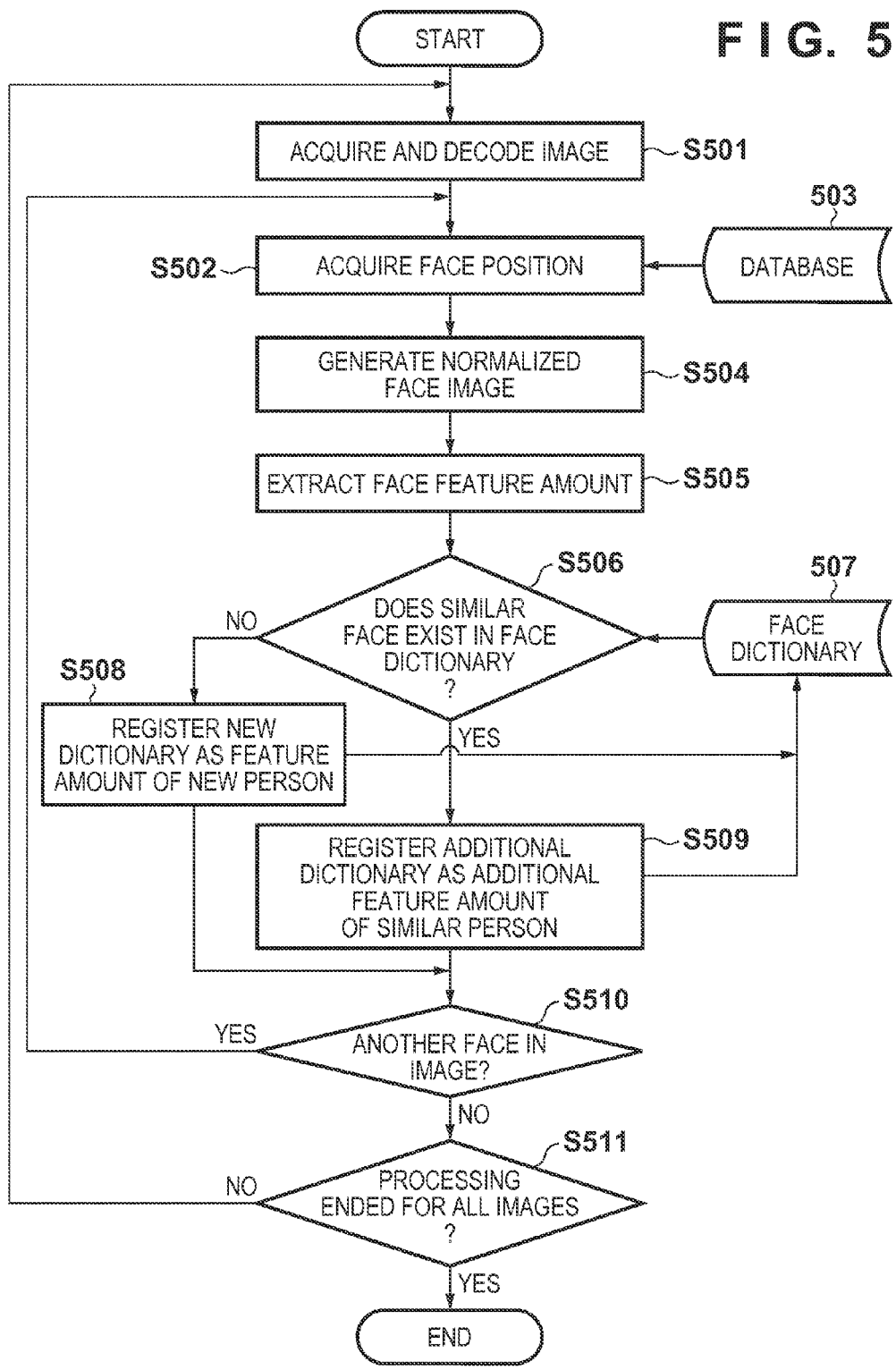
FIG. 5 is a flowchart of person group generation processing.

This person group generation processing is executed using a known personal recognition technique in accordance with a processing procedure shown in FIG. 5.

Note that the personal recognition technique mainly includes two techniques, that is, extracting the feature of an organ such as an eye or a mouth existing in a face and comparing the similarities of the relationships. As the technique, for example, a technique disclosed in Japanese Patent No. 3469031 can be used. Note that the above-described personal recognition technique is merely an example, and any method is usable in this embodiment.

FIG. 5 illustrates the procedure of processing of grouping face information supposed to be of the same person based on detected face position information. FIG. 5 is a flowchart corresponding to the person group generation processing (step S306 of FIG. 3 or step S405 of FIG. 4).

In step S501, the images saved in the secondary storage device 103 are sequentially read out and decoded. The decoding processing is the same as in step S302, and a description thereof will be omitted. In step S502, a database 503 is accessed, and the number of faces included in each image and the position information of each face are acquired. In step S504, normalized face images to be used for personal recognition processing are generated.

The normalized face images are face images obtained by extracting faces existing in the images with various sizes, orientations, and resolutions and converting them into faces having a predetermined size and orientation. Since the positions of organs such as an eye and a mouth are important in personal recognition, each normalized face image preferably has such a size that makes it possible to reliably recognize the above-described organs. When the normalized face images are prepared, it is unnecessary to cope with faces of various resolutions in the feature amount extraction processing.

In step S505, face feature amounts are extracted from the normalized face image. In this case, as a characteristic feature, the face feature amounts include the positions and sizes of organs such as an eye, mouth, and nose and the outline of the face.

In step S506, it is determined whether the face feature amounts are similar to face feature amounts in a database (to be referred to as a face dictionary 507 hereinafter) that stores face feature amounts prepared for each person identifier (ID) in advance. Note that details of the face dictionary will be described later. If the determination of step S506 ends with "YES", the face is determined to belong to the same person and added to the dictionary ID of that person in step S509.

If the determination of step S506 ends with "NO", the current evaluation target face is determined to belong to a person different from those registered in the face dictionary so far. Hence, a new person ID is issued, and the face is added to the face dictionary 507. In step S510, it is determined whether another face region exists in the processing target image data. If another face region exists (YES in step S510), the process returns to step S502. On the other hand, if no other face region exists (NO in step S510), the process advances to step S511.

In step S511, it is determined whether the processes of steps S502 to S509 have ended for all images. If the processes have ended for all images, the processing ends. If the processes have not ended for all images, the process returns to step S502. That is, the processes of steps S502 to S509 are applied to all face regions detected from the input image group, and the appearing persons are grouped.

The grouping result is described using an ID tag for each face region, as shown in the XML format of FIG. 14, and saved in the above-described database 304.

Note that in the above-described embodiment, the person group generation processing is executed after the sensing processing and database registration of all image data have ended, as shown in FIG. 3. However, this embodiment is not limited to this. For example, even when the sensing processing and the database registration of step S403 and the grouping processing of step S405 are repetitively performed for each image, as shown in FIG. 4, the same result can be generated.

Figure 7:
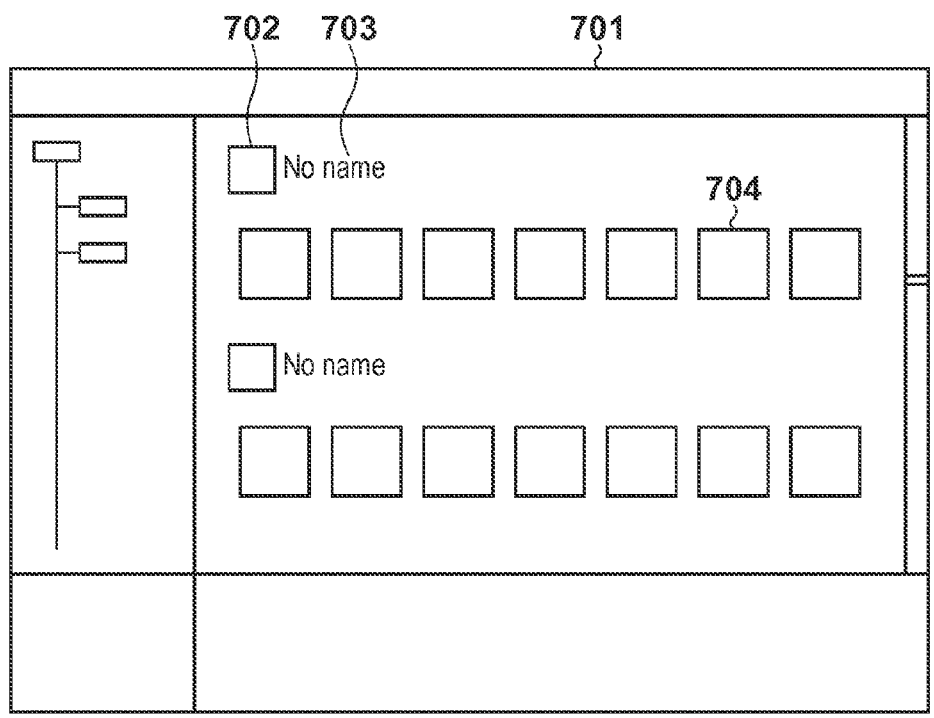
FIG. 7 is a view showing a display example of person groups.

Each person group obtained by the above-described processing is displayed on the UI of the display device 104. FIG. 7 shows the display of each person group according to this embodiment. On a UI 701 as shown in FIG. 7, reference numeral 702 denotes a representative face image of a person group. A region 703 to display the name of the person group exists on a side. Immediately after the automatic person grouping processing, "No name" is displayed as the person name, as shown in FIG. 7. Reference numeral 704 denotes a plurality of face images included in the person group. In the UI 701 shown in FIG. 7, the user can input a person name by designating the "No name" region 703 or can input information such as the birthday or family relationship for each person by operating the input device 105, as will be described later.

The sensing processing may be executed using the background task of the operating system. In this case, the user can continue the sensing processing of the image group even when another operation is being performed on the information processing apparatus 115.

In this embodiment, the user may be assumed to manually input various kinds of attribute information about an image. Alternatively, various kinds of attribute information about an image may be set automatically.

Table 2 shows a list of examples of attribute information. The manually or automatically registered attribute information is roughly divided into information set for each image and information set for each person grouped by the above-described processing.

TABLE 2

| Classification | Contents | Data type | Value |
| --- | --- | --- | --- |
| image | favorite rate | int | 0 to 5 |
|  | event | char | "travel" |

TABLE 2-continued

| Classification | Contents | Data type | Value |
| --- | --- | --- | --- |
| | | | "graduation" |
| | | | "wedding" |
| person | name | char | "NAME" |
| | birthday | char | YYYYMMDD |
| | family relationship | char | "family" |

Figure 11:
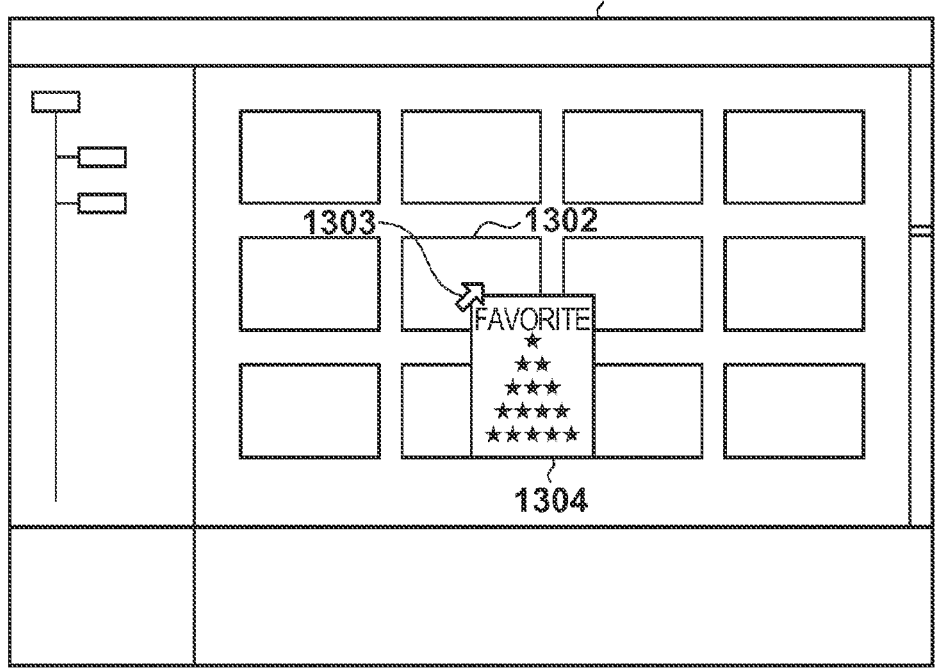
FIG. 11 is a view showing an example of a UI used to manually input the favorite rate.

An example of the information set for each image is the "favorite rate" of the user. The user can manually input, for example, the favorite rate representing whether the user likes the image. For example, as shown in FIG. 11, the user selects a desired thumbnail 1302 image on a UI 1301 by a mouse pointer 1303 and clicks the right bottom of the mouse, thereby displaying a dialogue capable of inputting the favorite rate. The user can select the number of ★ in the menu in accordance with his/her taste. In this embodiment, setting is done such that the higher the favorite rate is, the larger the number of ★ is.

The favorite rate may be set automatically, instead of causing the user to manually input. For example, the user's count of browsing may automatically be set as the favorite rate. Assume that the user clicks on a desired image file in the state shown in FIG. 8 in which the thumbnail image list is displayed to transit to a single image display screen. The transition count is measured, and the favorite rate is set in accordance with the measured count. That is, it is judged that the larger the browsing count is, the more the user likes the image.

As another example, the favorite rate may automatically be set in accordance with the printing count. More specifically, for example, the number of times of print instruction issuance for an image by the user is measured as the printing count. It is judged that the larger the printing count is, the higher the user's favorite rate of the image is.

As described above, as for the favorite rate, the method of causing the user to manually set the favorite rate, the method of automatically setting the favorite rate based on the browsing count or printing count, and the like are usable. The above-described attribute information is individually stored in the Userinfo tag of the database unit 202 using the XML format as shown in FIG. 10. For example, the favorite rate is represented by a FavoriteRate tag, the browsing count is represented by a ViewingTimes tag, and the printing count is represented by a PrintingTimes tag.

When the user manually designates an unnecessary region using a UI such as a mouse, the coordinate information of the unnecessary region or the like is stored in the Unnecessary tag.

Another attribute information set for each image is event information. Examples of the event information are "travel", "graduation", and "wedding".

Figure 12:
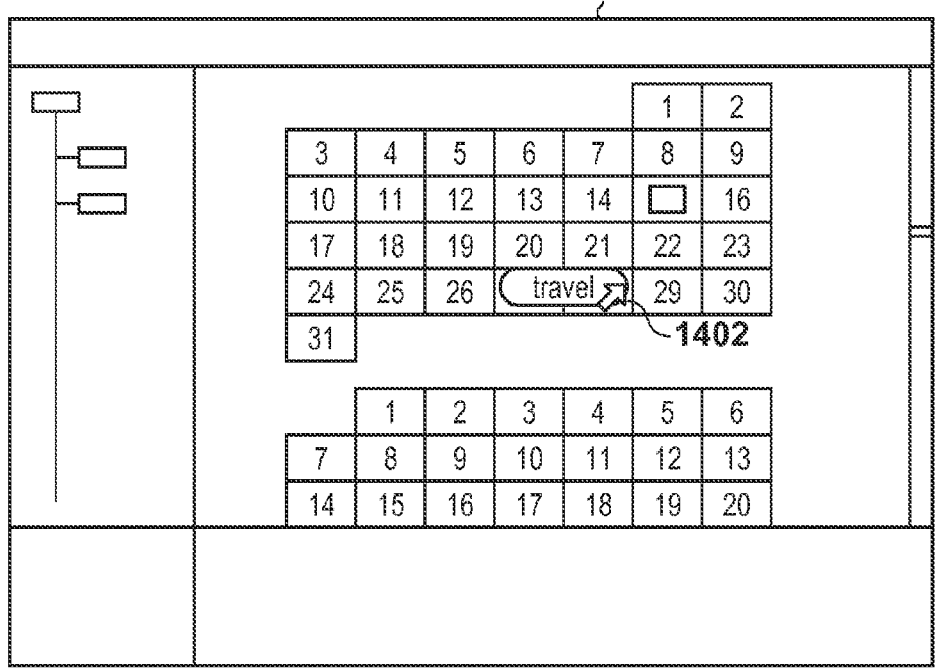
FIG. 12 is a view showing an example of a UI used to manually input event information.

To designate the event, for example, as shown in FIG. 12, a desired date may be designated on a calendar using a mouse pointer 1402 or the like, and the name of the event on that day may be input to set the event. The designated event name is included in the XML format shown in FIG. 10 as part of the image attribute information. In the format shown in FIG. 10, the event name and the image are associated (linked) with each other using an Event tag in the Userinfo tag.

Person attribute information will be described next with reference to FIG. 13.

FIG. 13 shows a UI used to input person attribute information. Referring to FIG. 13, reference numeral 1502 denotes a representative face image of a predetermined person (in this case, "father"). In addition, 1504 displays a list of images detected from other images and judged to have similar face feature amounts in step S506.

After the sensing processing, no name is input for each person group, as shown in FIG. 7. The user designates the "No name" region 703 using a mouse pointer. When the user inputs a person name by operating a keyboard or the like, the arbitrary person name can be input.

As an attribute of each person, the birthday of the person or the family relationship viewed from the user who is operating the application can also be set. In this embodiment, when clicking on the representative face 1502 of the person shown in FIG. 13, the user can input the birthday of the clicked person using a first input portion 1505 and the family relationship information using a second input portion 1506, as illustrated on the lower side of the screen.

Unlike the image attribute information linked with the images, the input person attribute information is managed in the database unit 202 separately from the image attribute information using the XML format as shown in FIG. 14.

In this embodiment, various layout templates are assumed to be prepared in advance. Examples of the layout templates are shown in FIGS. 15 and 17. Each layout template includes a plurality of image arrangement frames 1702, 1703, 1704, and 1902 (to be synonymous with slots hereinafter) on a paper size to lay out images.

The templates are saved in the secondary storage device in advance when the software to execute the embodiment is installed in the information processing apparatus 115. As another method, an arbitrary template group may be acquired from the external server 114 existing on the Internet 113 connected via the IF 107 or the wireless LAN I/F 109.

These templates are assumed to be described in a highly versatile structured language, for example, XML like the above-described sensing result storage. FIGS. 16 and 18 show examples of XML data. In FIGS. 16 and 18, first, a BASIC tag describes the basic information of the layout page. Examples of the basic information are the theme of the layout, the page size, and the page resolution (dpi). Referring to FIGS. 16 and 18, a Theme tag representing the layout theme is blank in the initial state of the template. In this embodiment, as the basic information, the page size is set to A4, and the resolution is set to 300 dpi.

Subsequently, information of each of the above-described image arrangement frames is described by an ImageSlot tag. The ImageSlot tag holds two tags, that is, an ID tag and a POSITION tag to describe the ID and position of the image arrangement frame. The position information is defined on, for example, an X-Y coordinate system having its origin at the upper left corner, as shown in FIG. 15 or 17.

The ImageSlot tag can also set, for each slot, the shape of the slot and the name of the recommended person group to be arranged. For example, in the template shown in FIG. 15, all slots have the "rectangle" shape, as indicated by the Shape tag in FIG. 16. As for the person group name, arranging "MainGroup" is recommended by the "PersonGroup" tag.

In addition, in the template shown in FIG. 17, the slot with ID=0 arranged at the center is described as a slot having the rectangle shape, as shown in FIG. 18. As for the person group, arranging "SubGroup" is recommended. The subsequent slots with ID=1, 2, . . . , have the ellipse shape. Arranging "MainGroup" as the person group is recommended.

In this embodiment, a number of such templates are held.

As described above, the application according to this embodiment can execute analysis processing for an input image group, automatically group persons, and display them on a UI. Viewing the result, the user can input attribute information such as a name and birthday for each person group and set the favorite rate or the like for each image.

It is also possible to hold a number of layout templates classified by the theme.

When the above-described conditions are satisfied, the application according to this embodiment performs, at a predetermined timing, processing of automatically generating a collage layout the user is likely to be fond of and presenting it to the user (to be referred to as layout proposal processing hereinafter).

Figure 6:
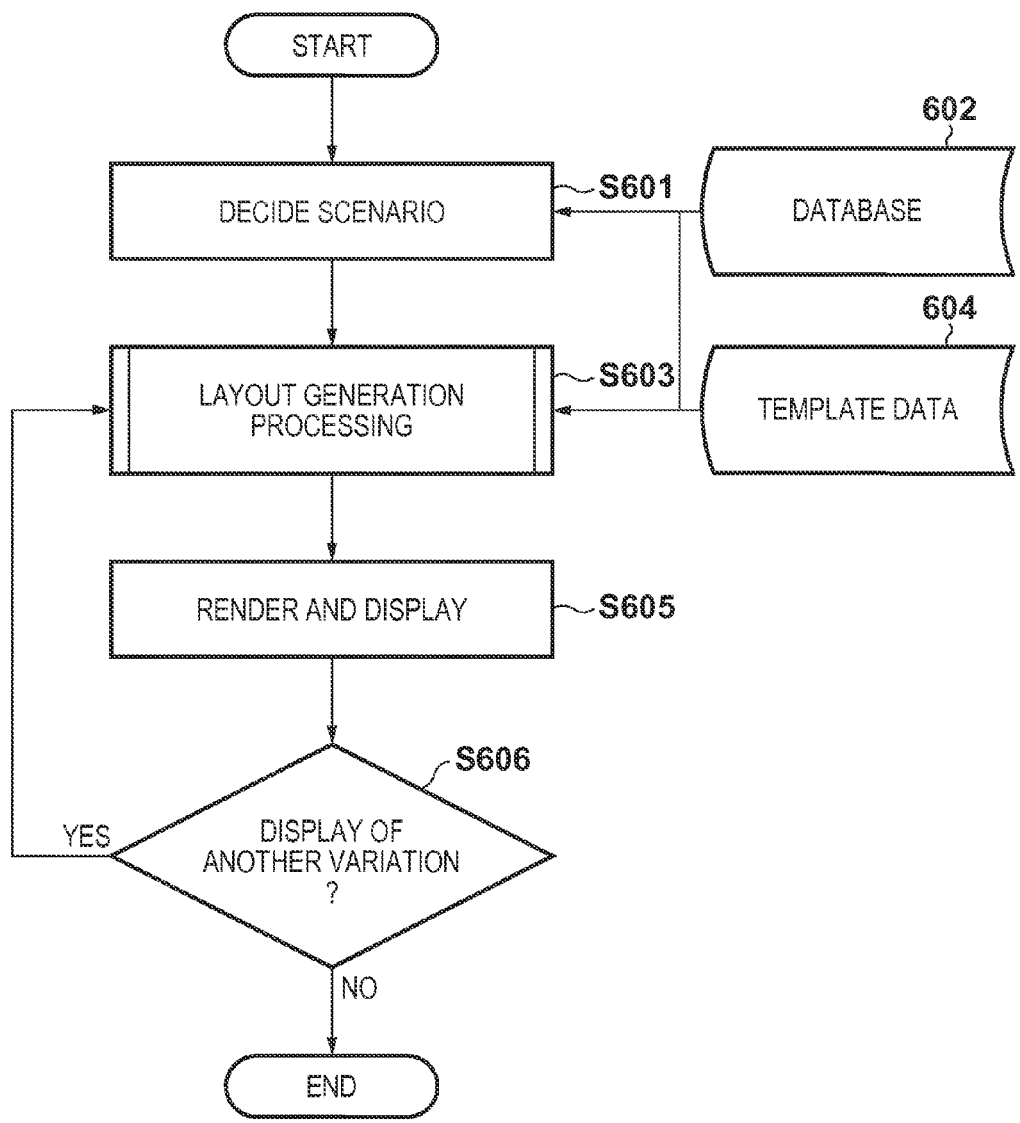
FIG. 6 is a flowchart of automatic layout proposal processing.

FIG. 6 illustrates the procedure of processing of deciding a scenario for layout creation based on image analysis information and various kinds of information input by the user and automatically generating a layout based on the scenario. In step S601, the scenario of proposal processing is decided. The scenario includes the theme of the layout to be proposed, decision of a template, settings of a person (main character) to be emphasized in the layout, and selection information of an image group to be used for layout generation.

Decision of two scenarios will be described below.

For example, assume that setting is done in advance so as to automatically generate and present a collage layout two weeks before the birthday of a person "son" automatically grouped in FIG. 13. Two weeks before the first birthday of "son", theme decision, template selection, and image selection are performed. For the first birthday of "son", the theme of the layout to be proposed is decided as "growth". Next, a template is selected. In this case, a template as shown in FIG. 17 suitable for "growth" is selected, and "growth" is described in the Theme tag portion of XML, as shown in FIG. 26. Next, "son" is set as the main character "MainGroup" on which focus is placed at the time of layout. Then, "son" and "father" are set as "SubGroup" on which focus is secondarily placed at the time of layout. An image group to be used for layout is selected. In this example, a database 602 is referred, and an enormous number of images including "son" are extracted and listed out of the images shot so far from the birthday of the person "son". The scenario decision for the growth layout has been described.

As an example different from that described above, assume that setting is done in advance so as to automatically generate and present a collage layout when there are travel photos shot within one month. Upon knowing, based on the event information registered in FIG. 12, that the family traveled several days ago, and an enormous number of images of the travel are saved in the secondary storage device 103, the layout generation unit 205 decides a scenario to propose a travel layout. In this case, the theme of the layout to be proposed is decided as "travel". Next, a template is selected. In this case, a layout as shown in FIG. 15 is selected, and "travel" is described in the Theme tag portion of XML, as shown in FIG. 27. Then, "son", "mother", and "father" are set as the main character "MainGroup" on which focus is placed at the time of layout. In this way, a plurality of persons can be set as "MainGroup" by taking advantage of the characteristics of XML. Next, an image group to be used for layout is selected. In this example, the database 602 is referred, and an enormous number of images linked with the travel event are extracted and listed. The scenario decision for the travel layout has been described.

Next, in step S603 of FIG. 6, automatic layout generation processing based on the above-described scenario is executed. The automatic layout generation processing based on the scenario will be described here with reference to FIG. 19. FIG. 19 illustrates the detailed processing procedure of the layout generation unit 205.

Referring to FIG. 19, in step S2101, layout template information 2102 decided by the above-described scenario generation processing after the layout theme and the person group information are set is acquired.

In step S2103, the feature amounts of each image are acquired from a database 2104 based on an image group list 2106 decided by the scenario, and an image group attribute information list is generated. The image group attribute information list has a structure in which the IMAGEINFO tags shown in FIG. 10 are arranged as many as the number of image lists. The automatic layout generation processing in steps S2105 to S2109 is performed based on the image group attribute information list.

As described above, in the automatic layout generation processing of this embodiment, attribute information saved in the database in advance by performing sensing processing for each image is used, instead of directly handling the image data itself. This is because if the image data itself is used when performing the layout generation processing, a very large memory area is necessary for storing the image group. That is, using the attribute information stored in the database unit 202 as in this embodiment makes it possible to reduce the utilization of the memory area.

In step S2105, unnecessary images are filtered from the input image group using the attribute information of the input image group. The filtering processing will be described here with reference to FIG. 20. FIG. 20 is a flowchart of the filtering processing. Referring to FIG. 20, in step S2201, it is determined for each image whether the average luminance of the entire image falls within the range of predetermined thresholds (ThY_Low and ThY_High). If NO in step S2201, the process advances to step S2206 to remove the target image from the layout target.

Similarly, in steps S2202 to S2205, whether the average luminance and average color difference components fall within the ranges of predetermined thresholds representing a satisfactory flesh color region is determined for each face region included in the target image. Only an image for which all determinations of steps S2202 to S2205 end with "YES" is applied to the subsequent layout generation processing.

More specifically, in step S2202, it is determined whether AveY of a face region with ID=N falls within the range of predetermined thresholds (ThfY_Low and ThfY_High). In step S2203, it is determined whether AveCb of the face region with ID=N falls within the range of predetermined thresholds (ThfCb_Low and ThfCb_High). In step S2204, it is determined whether AveCr of the face region with ID=N falls within the range of predetermined thresholds (ThfCr_Low and ThfCr_High). In step S2205, it is determined whether the face is the last face. If the face is not the last face, the process returns to step S2202. If the face is the last face, the processing ends.

Note that since this filtering processing aims at removing images that can obviously be judged as unnecessary for the subsequent temporary layout creation processing, the thresholds are preferably set relatively leniently. For example, when determining the luminance value of the entire image in step S2201, if the difference between ThY_High and ThY_Low is excessively smaller than the image dynamic range, the number of images determined as "YES" in each determination accordingly decreases. Hence, in the filtering processing of this embodiment, the difference between the thresholds is set as large as possible. In addition, thresholds that can remove an image that is obviously judged as an abnormal image are set.

Next, in step S2107 of FIG. 19, an enormous number of (L) temporary layouts are generated using the image group determined as the layout target by the above-described processing. Temporary layout generation is executed by repeating processing of arbitrarily applying an input image to an image arrangement frame of the acquired template.

When applying the input image to an image arrangement frame of the template, which image should be selected from the image group when N image arrangement frames exist in the layout is decided at random. In addition, which arrangement frames should be used to arrange a plurality of selected images is decided at random. Furthermore, a trimming ratio representing the degree of trimming processing to be performed when the images are arranged is decided at random.

Note that the trimming ratio is represented by, for example, 0% to 100%. An image is trimmed as shown in FIG. 21. Referring to FIG. 21, reference numeral 2301 denotes an entire image; and 2302, a cutting region for trimming at a trimming ratio of 50%. That is, the region 2302 is the output region to be output.

In this embodiment, based on the above-described image selection/arrangement/trimming criterion, temporary layouts are generated as many as possible. Note that depending on the selected theme, a condition that trimming is performed so as to include all target regions in the image as much as possible may be imposed at the time of temporary layout creation. This readily generates an excellent layout. The generated temporary layouts can be expressed by XML, as shown in FIG. 28. The ID of the image selected and arranged in each slot is described by the ImageID tag, and the trimming ratio is described by the TrimmingRatio tag.

Note that the number L of temporary layouts generated here is decided in accordance with the throughput of evaluation processing in a layout evaluation step to be described later and the performance of the information processing apparatus 115 that performs the processing. For example, several hundred thousand or more different temporary layouts are preferably prepared. Each generated temporary layout can be saved together with an ID in the secondary storage device 103 as a file using the XML format shown in FIG. 28, or stored on the RAM 102 using another data structure such as a structure.

Next, in step S2108 of FIG. 19, the L temporary layouts created above are evaluated using predetermined layout evaluation amounts. Table 3 shows a list of layout evaluation amounts according to this embodiment. As shown in Table 3, the layout evaluation amounts used in this embodiment can mainly be divided into there categories.

TABLE 3

| Category | Contents | Score range | Degree of importance for each theme (weight W) | |
|---|---|---|---|---|
| | | | growth | travel ... |
| individual image evaluation | brightness appropriateness | 0 to 100 | 0.5 | 1.0 |
| | saturation appropriateness | 0 to 100 | 0.5 | 1.0 |
| image/slot matching evaluation | person matching | 0 to 100 | 3.0 | 1.5 |
| | unnecessary region presence evaluation | 0 to 100 | 3.0 | 1.5 |
| in-page balance evaluation | image similarity | 0 to 100 | 0.5 | 1.0 |
| | hue variation | 0 to 100 | 0.5 | 1.0 |
| | face size variation | 0 to 100 | 0.5 | 1.0 |
| others | user's taste | 0 to 100 | 0.8 | 0.8 |

Figure 22:
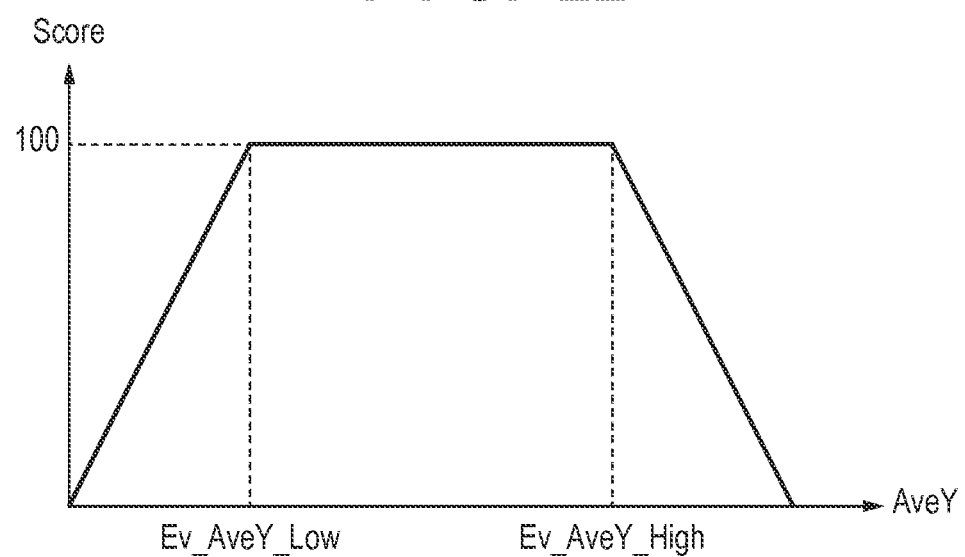
FIG. 22 is a graph for explaining a method of calculating brightness appropriateness.
Figure 23:
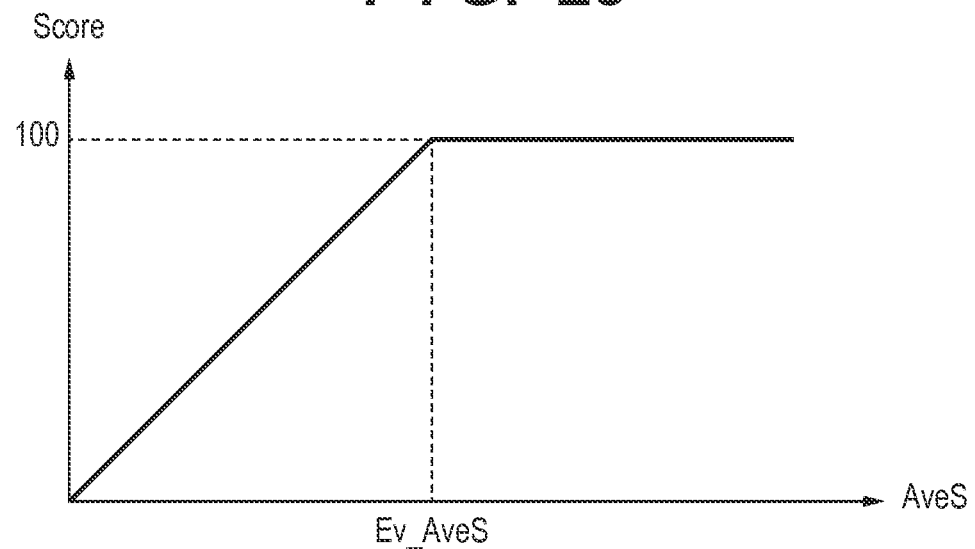
FIG. 23 is a graph for explaining a method of calculating saturation appropriateness.
Figure 24:
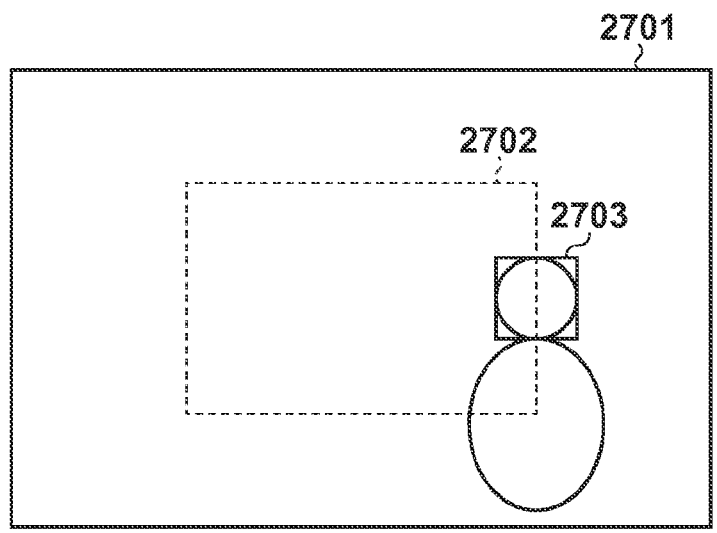
FIG. 24 is a view for explaining trimming loss determination processing.

The first evaluation category includes the evaluation amounts of each image. The evaluation amounts are used to judge states such as the brightness, saturation, and blur amount of an image and score the states. An example of scoring will be described below. FIG. 22 shows the brightness appropriateness. In the graph of FIG. 22, the ordinate represents the score, and the abscissa represents the average luminance (Ave Y). Referring to FIG. 22, the brightness appropriateness scores 100 when the average luminance falls within a predetermined range. The score is set so as to lower from 100 outside the predetermined threshold range. FIG. 23 shows the saturation appropriateness. In the graph of FIG. 23, the ordinate represents the score, and the abscissa represents the average saturation (Ave S). Referring to FIG. 23, the saturation appropriateness scores 100 when the average saturation of the entire image is larger than a predetermined saturation value. The score is set so as to gradually decrease when the average saturation is smaller than the predetermined value.

The second evaluation category is evaluation of matching between an image and a slot in a template (image/slot matching evaluation). This scores the degree of matching between an image and a slot.

In this embodiment, the evaluation value of the matching between an image and a slot is calculated using the above-described unnecessary region presence evaluation. That is, it is determined whether, in an image arranged in an arrangement frame (slot) of a template, a target region in the image is partially placed off the arrangement frame in the layout, and the target region is partially included in the arrangement frame. The matching between the image and the slot is evaluated based on the determination result. More specifically, the matching when the target region is partially placed off the arrangement frame is evaluated higher than in a case in which the target region is wholly placed off the arrangement frame or a case in which the target region is wholly included in the arrangement frame.

Another example of the image/slot matching evaluation value is person matching. The person matching represents the matching ratio of a person designated for a slot to a person who exists in the image actually arranged in the slot. For example, assume that "father" and "son" are designated for a slot by the PersonGroup tag designated by XML. At this time, when the two persons are included in the image assigned to the slot, the person matching of the slot scores 100. If only one of the persons is included, the matching scores 50. If neither person is included, the person matching scores 0. That is, trimming that makes the designated target region (person) exists in the slot is evaluated highly. Such trimming is preferentially employed.

The matching in a page is the average value of the matchings calculated for the respective slots.

The third evaluation category evaluates the balance in a layout page. Table 3 presents several evaluation values used to evaluate the balance.

The image similarity will be described first. As the image similarity, the similarity between the images is calculated for each of the enormous number of generated temporary layouts. For example, if only similar images that resemble each other are arranged at the time of creating a layout of theme "travel", the layout may be not good. For example, the similarity can be evaluated by the shooting date/time. If the shooting dates/times of images are close, there is a high possibility that the images were shot at similar places. However, if the shooting dates/times are far off, both the scenes and the places are different at a high possibility.

The shooting date/time can be acquired from the attribute information of each image, which is saved in the database unit 202 in advance as image attribute information, as shown in FIG. 10. To obtain the similarity from the shooting dates/times, the following calculation is performed.

TABLE 4

| Image ID | Shooting date/time |
| --- | --- |
| 25 | 20100101: 120000 |
| 86 | 20100101: 150000 |
| 102 | 20100101: 170000 |
| 108 | 20100101: 173000 |

For example, assume that four images as shown in Table 4 are laid out in the target temporary layout. Note that in Table 4, shooting date/time information is added to each image specified by an image ID. More specifically, year/month/day and time (Christian Era year: YYYY, month: MM, day: DD, hour: HH, minute: MM, and second: SS) are added as a shooting date/time. At this time, the shortest capturing time interval between the four images is calculated. In this case, the time interval of 30 min between image ID "102" and image ID "108" is the shortest. This interval is set as MinInterval and stored in seconds. That is, 30 min=1800 sec. The MinInterval is calculated for each of the L temporary layouts and stored in an array stMinInterval[l]. A maximum value MaxMinInterval in stMinInterval[l] is obtained. A similarity evaluation value Similarity[l] of the lth temporary layout can be obtained by Similarity[*l*]=100×stMinInterval[*l*]/MaxMinInterval That is, the value Similarity[l] is effective as the image similarity evaluation value because it is close to 100 as the minimum capturing time interval becomes large, and close to 0 as the time interval becomes small.

The tone variation will be explained next as the evaluation value used to evaluate the balance in a layout page. For example, if only images of similar colors (for example, blue of a blue sky, green of a mountain) are arranged at the time of creating a layout of theme "travel", the layout may be not good. Hence, the variance of the average hues AveH of images existing in the lth target temporary layout is calculated and stored as a hue variation tmpColorVariance[l]. A maximum value MaxColorVariance in tmpColorVariance[l] is obtained. A color variation evaluation value ColorVariance[l] of the lth temporary layout can be obtained by ColorVariance[*l*]=100×tmpColorVariance[*l*]/MaxColorVariance That is, the value ColorVariance[l] is effective as the hue variation evaluation value because it is close to 100 as the variation of the average hues of the images arranged in a page becomes large, and close to 0 as the variation of the average hues becomes small.

The face size variation will be explained next as the evaluation value used to evaluate the balance in a layout page. For example, if only images of similar face sizes are arranged in a layout result at the time of creating a layout of theme "travel", the layout may be not good. Assume that a good layout is obtained when images of a variety of face sizes, including small and large face sizes on a paper sheet after layout, are arranged in balance. In this case, the face size variation is set large. Hence, the variance of face sizes (the diagonal distance from the upper left to the lower right of a face position) arranged in the lth target temporary layout is stored as tmpFaceVariance[l]. A maximum value MaxFaceVariance in tmpFaceVariance[l] is obtained. A face size variation evaluation value FaceVariance[l] of the lth temporary layout can be obtained by FaceVariance[*l*]=100×tmpFaceVariance[*l*]/MaxFaceVariance That is, the value FaceVariance[l] is effective as the face size variation evaluation value because it is close to 100 as the variation of the face sizes arranged on a paper sheet becomes large, and close to 0 as the variation of the face sizes becomes small.

As another category, user taste evaluation is usable.

The plurality of evaluation values described above, which are calculated for each temporary layout, will be integrated and referred to as a layout evaluation value for each temporary layout hereinafter. Let EvalLayout[l] be the integrated evaluation value of the lth temporary layout, and EvalValue [n] be N evaluation values (including the evaluation values shown in Table 3) calculated above. At this time, the integrated evaluation value can be obtained by $$EvalLayout[l] = \sum_{n=0}^{N} EvalValue\ [n] \times W[n]$$

where W[n] is the weight of each evaluation value of shown in Table 3 for each scene. As a characteristic feature, a different weight is set for each layout theme. For example, the themes "growth" and "travel" are compared, as shown in Table 3. For the theme "travel", a number of photos whose quality is as high as possible are laid out in a variety of scenes. Hence, settings are done to emphasize the individual evaluation values of the images and the in-page balance evaluation values. On the other hand, for "growth", whether the main character as the growth target properly matches each slot is more important than the image variation. Hence, settings are done to emphasize the image/slot matching evaluation more than in-page balance or the individual evaluation of images.

When the weight of unnecessary region presence evaluation is set high, as shown in Table 3, a layout with a small number of obstructive objects is preferentially obtained. As another example, when only the weight of the unnecessary region presence evaluation is set to 1.0 or the like, and the weights of all the remaining items are set to 0, a layout result specialized to the unnecessary region presence evaluation can be obtained.

In step S2109, a layout list LayoutList[k] for layout result display is generated using EvalLayout[l] calculated in the above-described way. For the layout list, an identifier l is stored in descending order of evaluation value out of EvalLayout[l] for a predetermined number of (for example, five) layouts. For example, if the temporary layout created for the 50th time has the highest score, layout list LayoutList[0]=50. Similarly, after the layout list LayoutList[1], the identifier l for the second highest score is stored.

The flowchart of FIG. 19 has been described above.

Next, the layout result obtained by the processing described with reference to FIG. 19 is displayed in step S605 of FIG. 6. In this embodiment, the result is displayed on a UI 2901 shown in FIG. 25. In step S605, the layout identifier stored in LayoutList[0] is read out, and the temporary layout result corresponding to the identifier is read out from the secondary storage device 103 or RAM 102. In the layout result, as described above, template information and image names and trimming information assigned to the respective slots existing in the template are set. In step S605, the layout result is rendered based on these pieces of information using the rendering function of the OS operating on the information processing apparatus 115 and displayed, as indicated by a layout 2902 in FIG. 25.

Figure 25:
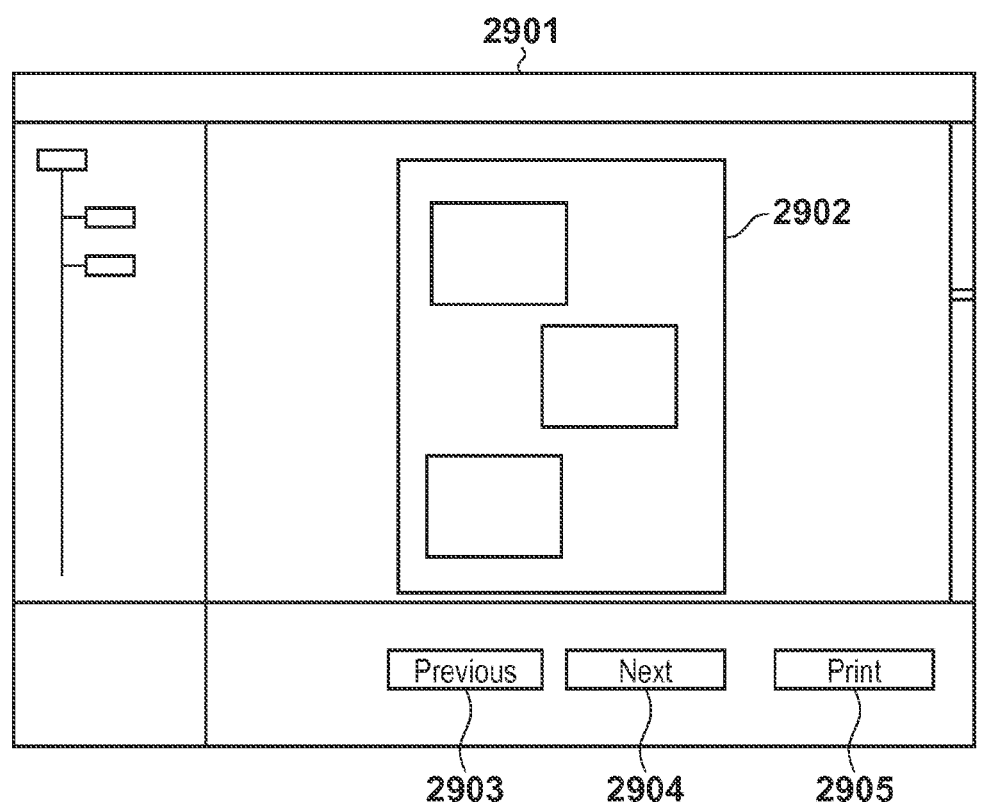
FIG. 25 is a view showing a display example of an automatic layout generation result.

When the user presses a Next button 2904 in FIG. 25, the identifier of layout list LayoutList[1] of the next score is read out. The layout result is rendered and displayed in the same manner as described above. This allows the user to browse variations of proposed layouts. The user can also redisplay the layout displayed previously by pressing a Previous button 2903. If the user likes the displayed layout, he/she can press a print button 2905 to cause the printer 112 connected to the information processing apparatus 115 to print the layout 2902.

As described above, according to this embodiment, the output target region (region visualized by output processing such as display or printing) is decided so as not to include an unnecessary region in the output target region. More specifically, a target region such as a face region is specified, and it is determined whether to include the target region in the output target region. For example, it is determined whether a person corresponding to a face region is a person registered by the user. Upon determining not to include the target region in the output target region (upon determining that the target region is unnecessary), the output target region that does not include the target region can be decided. It is therefore possible to decide the output target region while including, for example, the face region of a specific person in the output target region and excluding the face region of a person other than the specific person from the output target region.

In addition, even if the person corresponding to the region specified as a face is not registered by the user, the person can be included in the output target region depending on the position and size of the region in the image. For example, when a face region close to the face region of a person registered by the user is specified, the face region is included in the output target. It is therefore possible to, for example, include, in the output target, the face of a person shot adjacently to a person registered by the user.

Second Embodiment

In the above-described first embodiment, unnecessary region presence evaluation is performed as part of layout evaluation after an enormous number of temporary layouts are created. In the second embodiment, when creating a layout, it is created such that target regions are not cut off. More specifically, a number of trimming region candidates are set for arrangement candidate images to be arranged on a template, and the above-described unnecessary region presence evaluation is then performed. The trimming regions have the same aspect ratio as a slot, and candidates in various sizes are set. In this embodiment, the trimming regions are set from a small area. Unnecessary region presence evaluation is performed by setting a trimming region from the coordinates of the upper left corner of an image. If the unnecessary region presence evaluation value for the set trimming region candidate is higher than a predetermined threshold, the layout is set as a temporary layout candidate. The position is moved on a pixel basis rightward from the coordinates of the upper left. When the evaluation has been done up to the rightmost coordinate, the position is shifted downward from the upper left by one pixel and then moved rightward again to perform evaluation. When the evaluation has been done in the whole region of the image, the area of the trimming region is increased, and the evaluation is performed in a similar way.

When the unnecessary region presence evaluation is performed in this way, and a layout is created using one of the trimming candidates with evaluation values equal to or higher than the threshold, trimming that displays an unnecessary object in a slot hardly occurs.

Third Embodiment

In the above-described first embodiment, trimming that makes an unnecessary region absent in an image arrangement region is preferably employed. In the third embodiment, it is determined whether an unnecessary region exists in an image arrangement region. If an unnecessary region exists, it is stored. Note that the determination method can be the same as in the first embodiment.

A rendering unit 206 performs image manipulation processing such as known shade off processing, intra-frame interpolation processing, or inter-frame interpolation processing for an unnecessary region of an image, thereby deleting the object of the unnecessary region from the image or making it unnoticeable. As an example of shade off processing, convolution using a Gaussian filter is performed. Intra-frame interpolation indicates estimating a state without the unnecessary region and deleting the unnecessary region using pixels outside the unnecessary region in the image. Inter-frame interpolation is a technique used when a temporally close shot image is obtained in, for example, continuous shooting or a moving image, and indicates deleting the object of the unnecessary region by replacing the target image without the object of the unnecessary region with the pixels of a temporal close image.

With this processing, the object of the unnecessary region becomes unnoticeable, and an image that gives unfavorable impression hardly occurs.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-154005, filed Jul. 9, 2012, which is hereby incorporated by reference herein in its entirety.

What is claimed is:

1. An apparatus comprising:
a registration unit configured to register a person, in a database, in accordance with an instruction by a user;
a detecting unit configured to detect information relating to image data;
a grouping unit configured to perform person grouping, in a plurality of images, based on the information detected from the plurality of images by said detecting unit, wherein a result of the person grouping is registered in the database;
a determination unit configured to determine one or more regions, in an image, corresponding to one or more persons; and a decision unit configured to, in a case where a first region corresponding to the person who has been registered in the database by the registration unit and a second region corresponding to a person who has not been registered in the database by the registration unit are both determined in one image by said determination unit, decide a portion of an output target in the one image based on the determination by said determination unit and the registration by said registration unit, so that the portion includes the first region and does not include the second region.

2. The apparatus according to claim 1, wherein said determination unit specifies the one or more specified regions corresponding to one or more persons, and further determines the first region and the second region, from the plurality of specified regions.

3. The apparatus according to claim 2, wherein said determination unit determines whether to include each of the plurality of regions in the output target based on whether each of the plurality of specified regions corresponds to the person who has been registered by said registration unit.

4. The apparatus according to claim 1, wherein said determination unit determines one or more regions corresponding to one or more faces of the one or more persons.

5. The apparatus according to claim 4, wherein said registration unit registers information representing a face corresponding to the person, and said determination unit specifies the one or more regions corresponding to the one or more faces and determines the first region, based on the information registered in the database by said registration unit.

6. The apparatus according to claim 1, wherein said decision unit decides the portion, based on at least one of a position and a size of the first region.

7. The apparatus according to claim 1, wherein said decision unit decides, as the portion of the output target, a portion of an arrangement target in the one image in a case where the one image is arranged on a template.

8. The apparatus according to claim 7, further comprising a generation unit configured to generate a layout in which the one image is arranged on the template,
wherein said decision unit decides, based on the portion arranged in each of a plurality of layouts generated by said generation unit, a layout of the output target in which the portion of the output target is arranged, from the plurality of layouts.

9. The apparatus according to claim 8, further comprising a display control unit configured to cause a display device to display the layout of the output target sequentially decided from the plurality of layouts by said decision unit.

10. A method for an apparatus including a processor and a memory, the method comprising:
registering a person, in a database, in accordance with an instruction by a user;
detecting information relating to image data;
performing person grouping, in a plurality of images, based on the information detected from the plurality of images in the detecting, wherein a result of the person grouping is registered in the database;
determining a region in an image, with the processor, corresponding to one or more persons; and
deciding, with the processor, in a case where a first region corresponding to the person who has been registered in the database and a second region corresponding to a person who has not been registered in the database are both determined to be in one image, a portion of an output target in the one image based on the determination and the registration of the person in the database, so that the portion includes the first region and does not include the second region.

11. The method according to claim 10, wherein in the determining, the one or more specified regions corresponding to the one or more persons are specified, and further the first region and the second region, is determined from the plurality of specified regions.

12. The method according to claim 11, wherein in the determining, it is determined whether to include each of the plurality of specified regions in the output target based on whether each of the plurality of specified regions corresponds to the person who has been registered.

13. The method according to claim 10, wherein in the determining, one or more regions corresponding to one or more faces of the one or more persons are determined.

14. The method according to claim 13, wherein in the registering, information representing a dace corresponding to the person is registered, and in the determining, the one or more regions corresponding to the one or more faces are specified and the first region is determined based on the information registered in the database.

15. The method according to claim 10, wherein in the deciding, the person is decided based on at least one of a position and a size of the first region.

16. The method according to claim 10, wherein in the deciding, a portion of an arrangement target in the one image in a case where the one image is arranged on a template is decided as the portion of the output target.

17. The method according to claim 16, further comprising generating a layout in which the one image is arranged on the template,
wherein in the deciding, a layout of the output target in which the portion of the output target is arranged, is decided from a plurality of layouts based on the portion arranged in each of the plurality of layouts generated in the generating.

18. The method according to claim 17, further comprising causing a display device to display the layout of the output target sequentially decided from the plurality of layouts in the deciding.

19. A non-transitory computer-readable medium storing a program that causes a computer to execute a method comprising the steps of:
registering a person, in a database, in accordance with an instruction by a user;
detecting information relating to image data;
performing person grouping, in a plurality of images, based on the information detected from the plurality of images in the detecting, wherein a result of the person grouping is registered in the database;
determining a region in an image, with the processor, corresponding to one or more persons; and
deciding, with the processor, in a case where a first region corresponding to the person who has been registered in the database and a second region corresponding to a person who has not been registered in the database are both determined to be in one image, a portion of an output target in the one image based on the determination and the registration of the person in the database, so that the portion includes the first region and does not include the second region.

* * * * *